United States Patent [19]

Brown et al.

[11] Patent Number: 4,623,293

[45] Date of Patent: Nov. 18, 1986

[54] APPARATUS FOR ORIENTATING ELONGATE BODIES

[75] Inventors: Christopher K. Brown, Camp Hill; Lex D. Kensinger, Annville; Gregory S. Klopp, Hummelstown; Alden O. Long, Jr., Carlisle; Carl L. Moyer, Mt. Penn; William R. Over, Harrisburg; Herman D. Walter, Camp Hill, all of Pa.

[73] Assignee: AMP Incorporated, Harrisburg, Pa.

[21] Appl. No.: 699,964

[22] Filed: Feb. 8, 1985

[51] Int. Cl.4 ............................................. B65G 59/06
[52] U.S. Cl. ..................................... 414/126; 221/131; 221/171; 221/298; 414/82
[58] Field of Search ....................... 414/31, 32, 33, 41, 414/47, 55, 82, 125, 126, 113; 221/124, 131, 156, 171, 172, 298

[56] References Cited

U.S. PATENT DOCUMENTS

| | | | |
|---|---|---|---|
| 985,008 | 2/1911 | Cooper | 414/113 X |
| 2,661,103 | 12/1953 | Fay et al. | 414/47 X |
| 2,921,508 | 1/1960 | Schneider et al. | 414/32 |
| 3,443,706 | 5/1969 | Puhm | 414/126 X |
| 3,477,591 | 11/1969 | Andersson | 414/31 |
| 3,767,065 | 10/1973 | Hall et al. | 414/47 X |
| 4,074,425 | 2/1978 | Hashimoto et al. | 221/171 X |
| 4,124,128 | 11/1978 | Adams et al. | 414/55 X |
| 4,156,335 | 5/1979 | Strobl et al. | 221/171 X |
| 4,477,219 | 10/1984 | Sauder | 414/113 X |

FOREIGN PATENT DOCUMENTS 964583  5/1957  Fed. Rep. of Germany ........ 414/31

Primary Examiner—Leslie J. Paperner
Attorney, Agent, or Firm—Thomas G. Terrell

[57] ABSTRACT

Apparatus for orienting elongate bodies, for example electrical connectors, comprises magazines for containing vertical stacks of the elongate bodies, escapement slides for releasing one body at a time from each magazine, as required, first and second slidable traps mounted beneath the escapement slides and having an advanced, body supporting position and a retracted body release position, and guide surfaces on the escapement slides for guiding each body as it falls from a magazine, so that it lies across both of the traps when they are in their body supporting position. A pair of receptacles are slidably mounted on a carriage beneath the traps so that either of these receptacles can be positioned to receive a body released by the traps. If one trap is first retracted, the body will fall into the receptacle in one vertical orientation and if the other trap is first retracted, the body will fall into the receptacle in the opposite vertical orientation. The bodies may be stacked in the magazines so that in one of them the bodies are in one endwise orientation and in the other the bodies are in the opposite endwise orientation.

9 Claims, 30 Drawing Figures

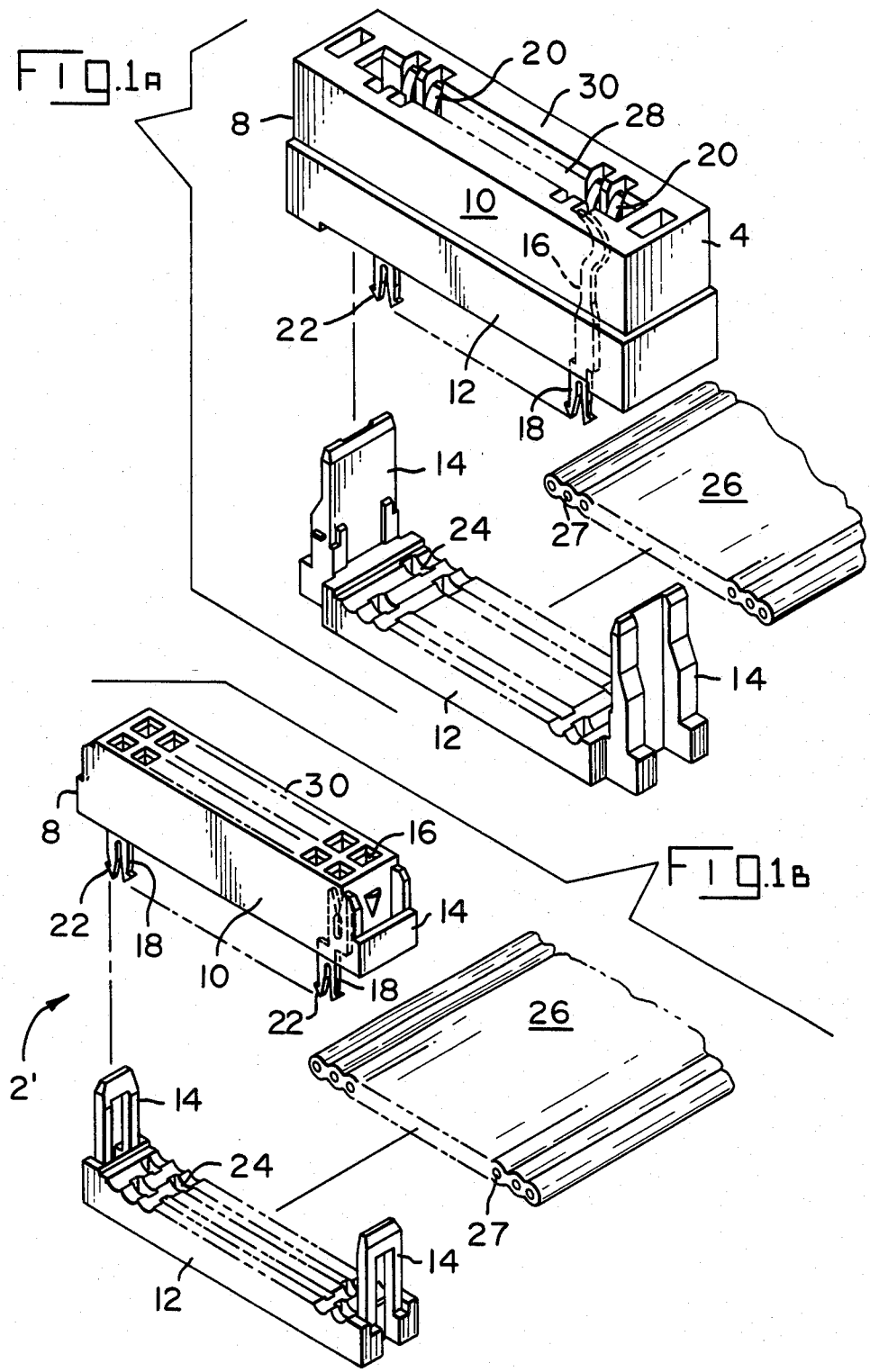

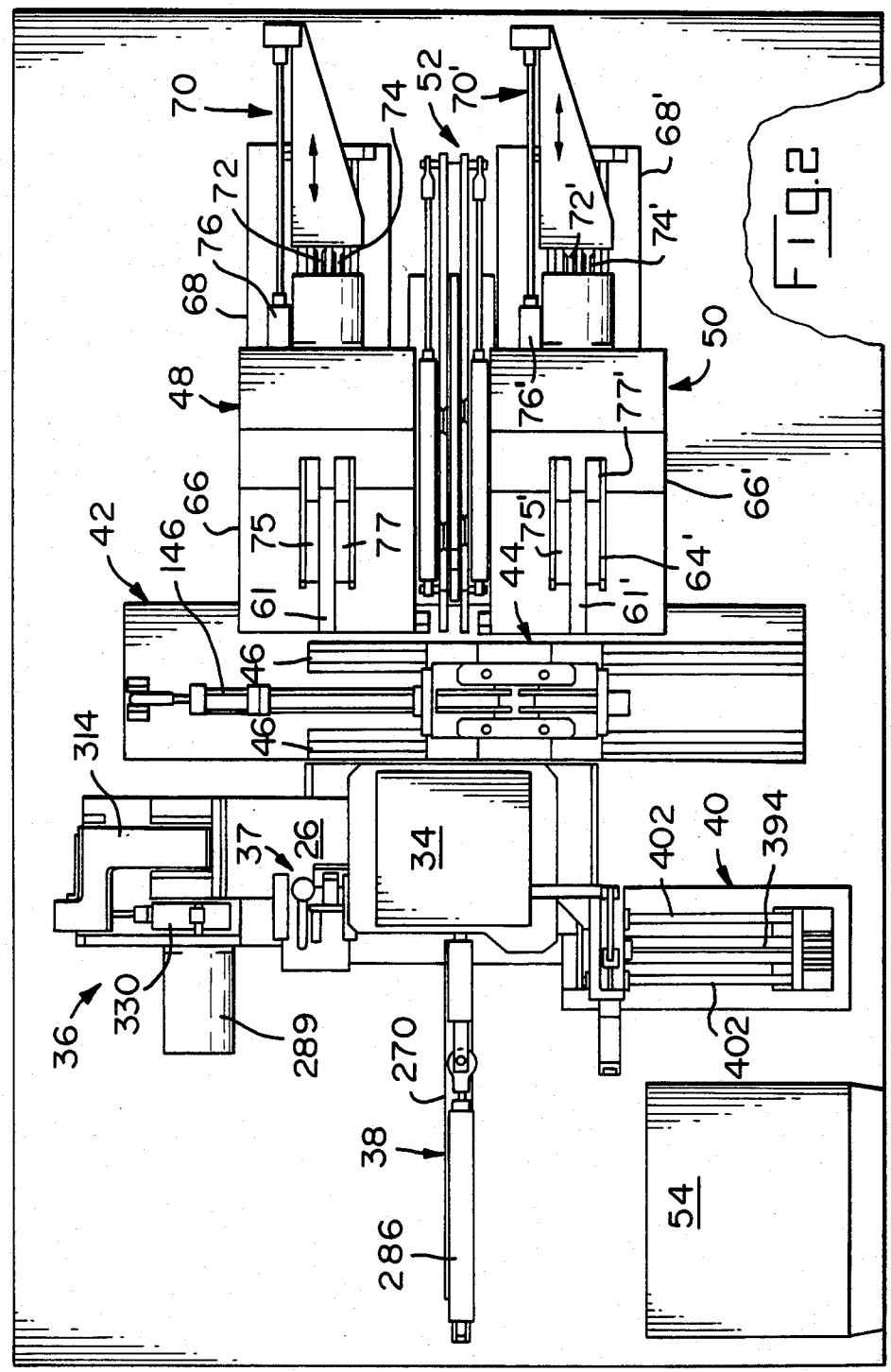

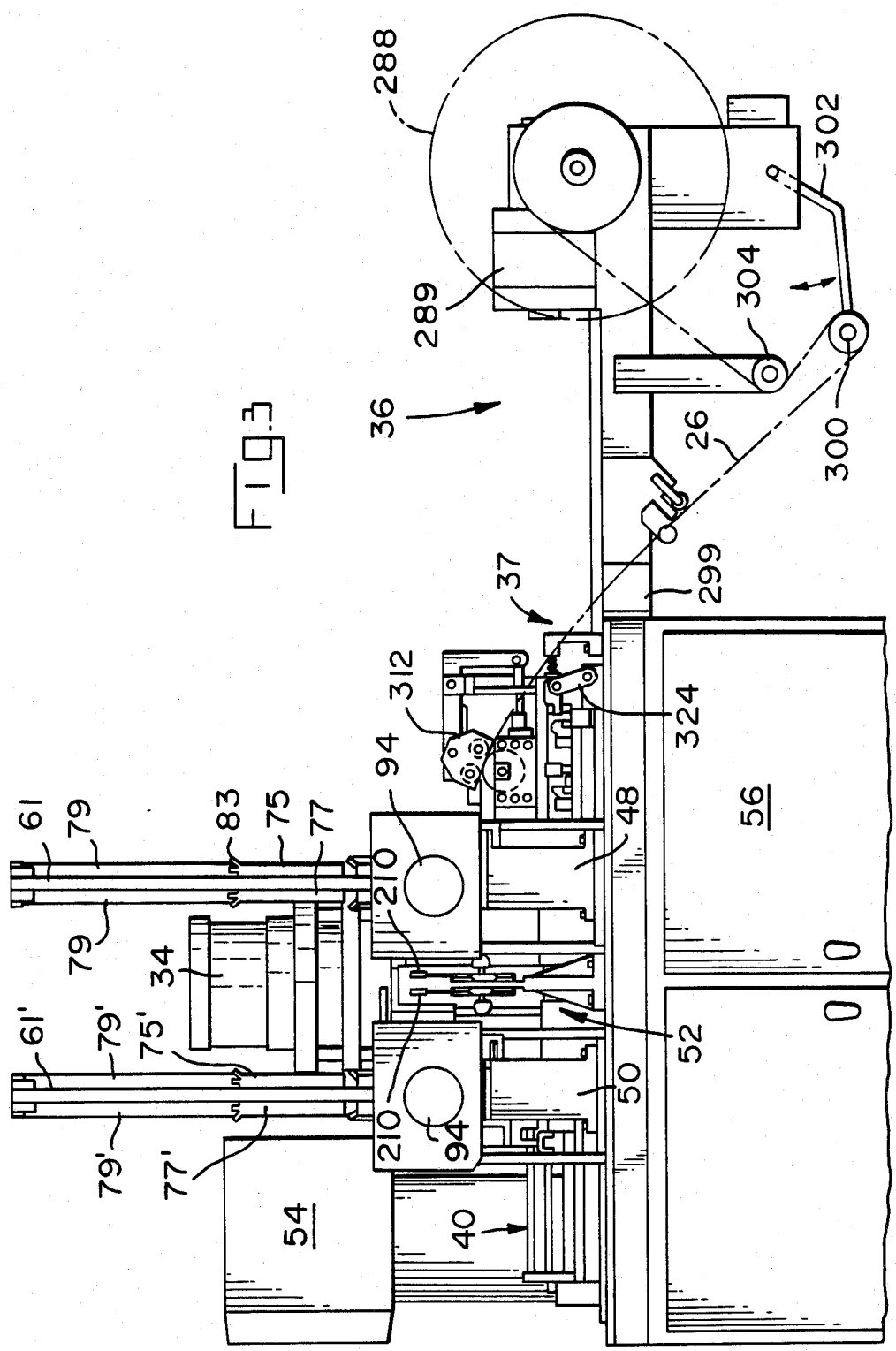

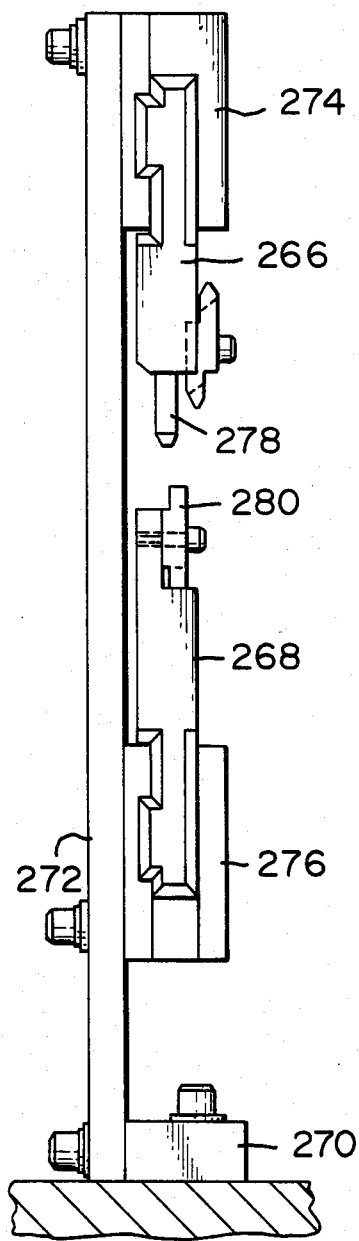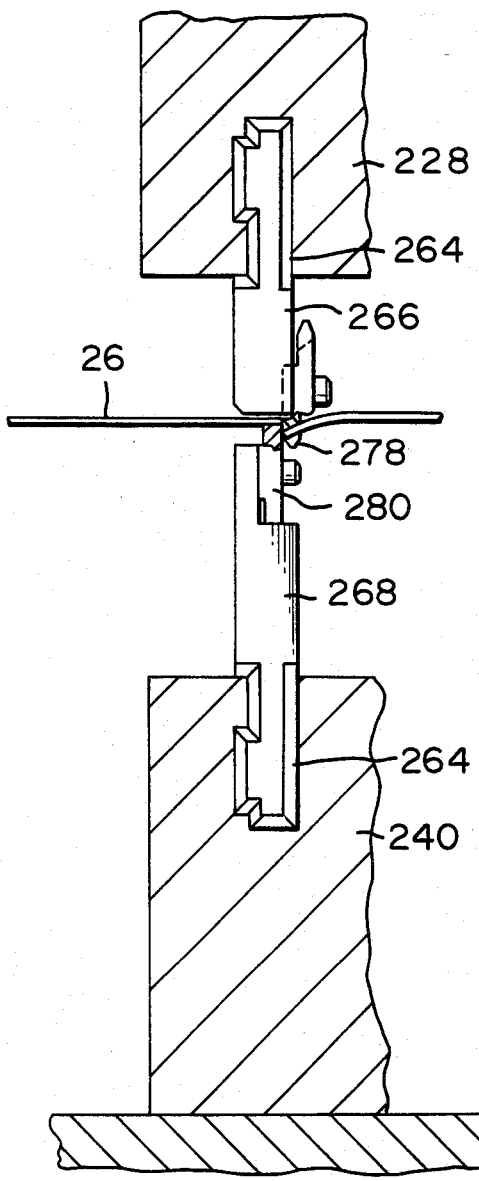

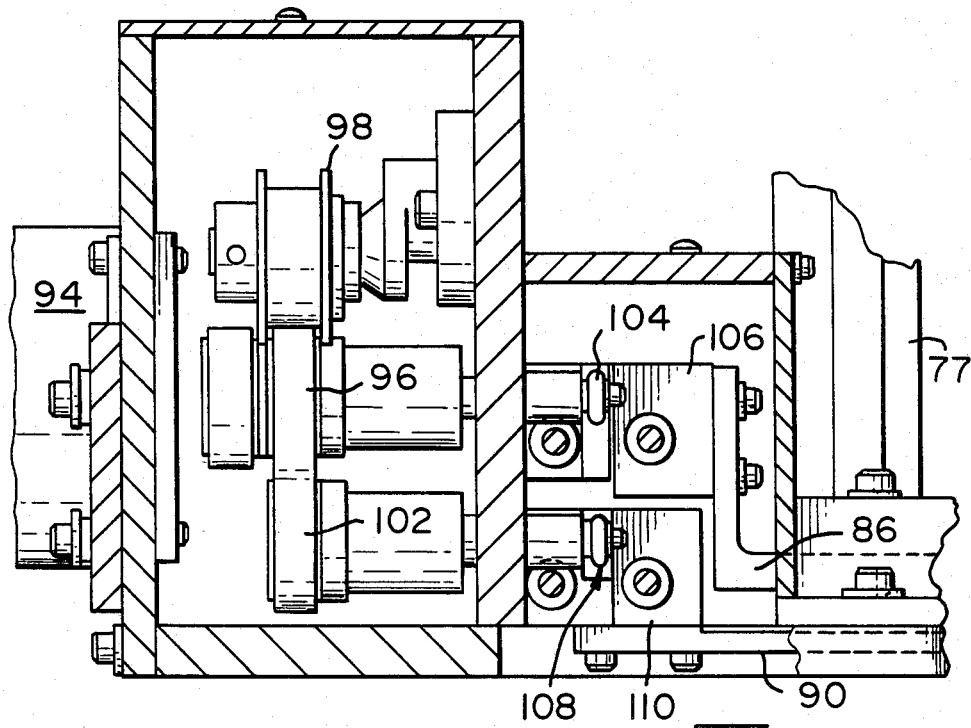
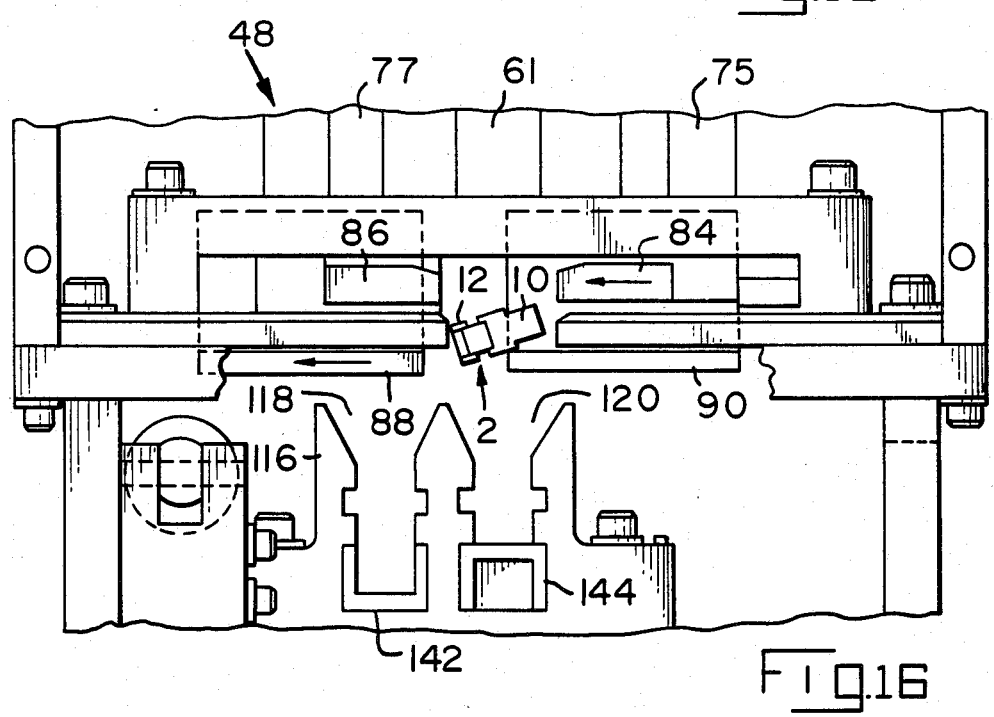

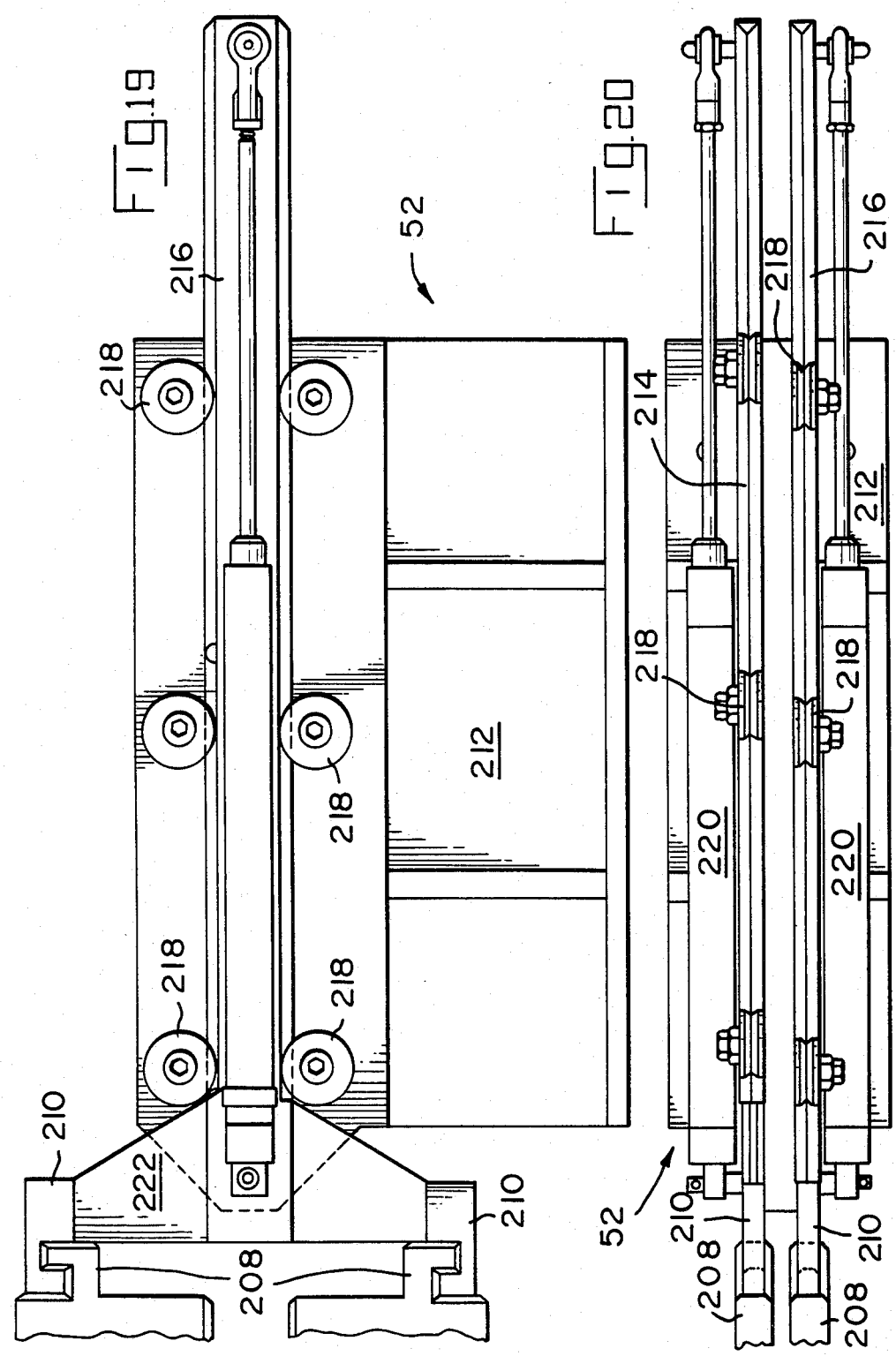

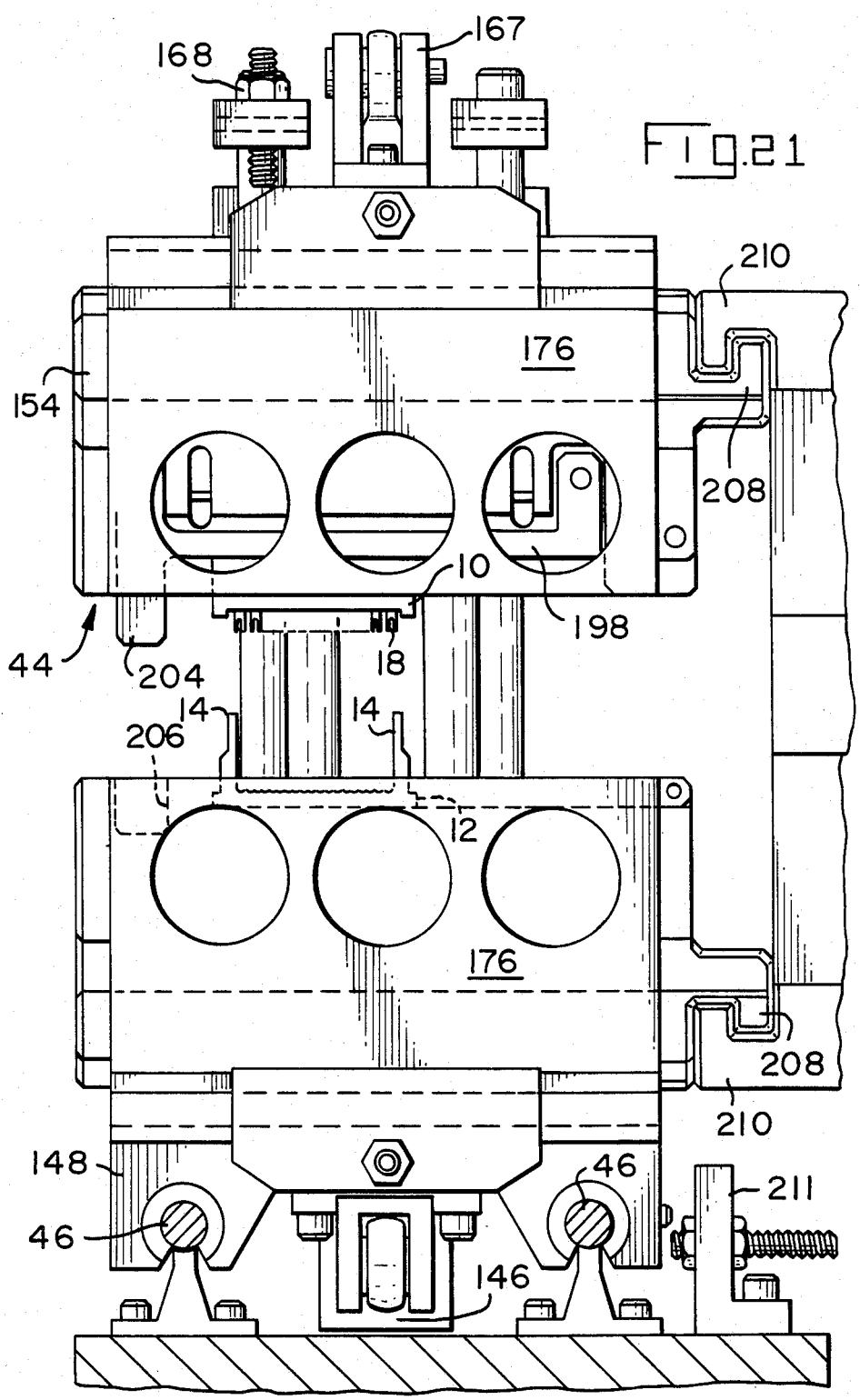

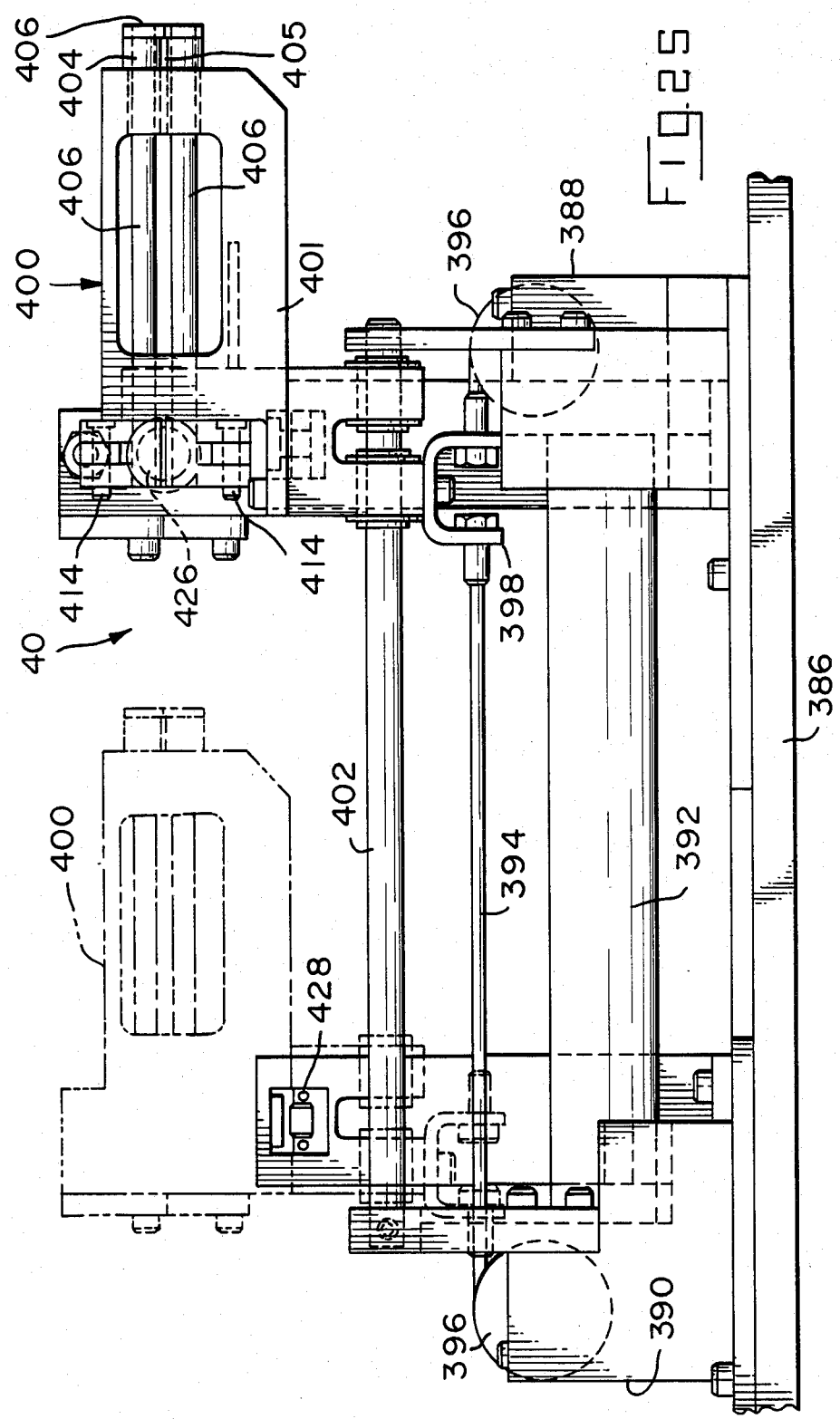

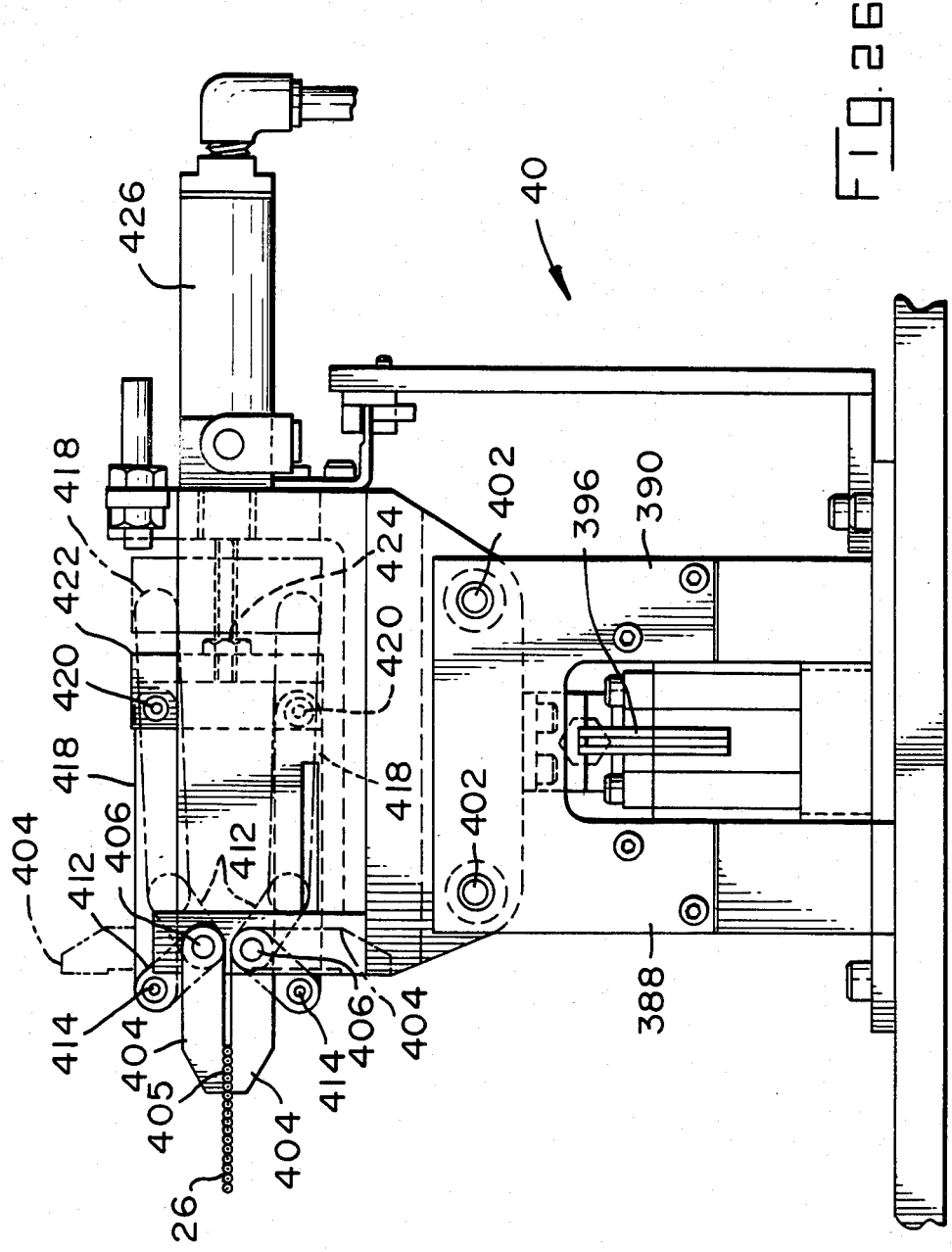

APPARATUS FOR ORIENTATING ELONGATE BODIES

This invention relates to apparatus for orienting elongate bodies, especially, but not exclusively, in the form of electrical elongate connectors.

When delivering such bodies to a work station, for applying them to a workpiece, it may be a requirement that the bodies be so delivered that they are applied to the workpiece in a plurality of different vertical or endwise orientations. In the example described herein, elongate electrical connectors are delivered to a press for applying them to a flat multi-conductor cable, in selected vertical and horizontal orientations.

According to the invention, apparatus for orienting elongate bodies, for example, electrical connectors, comprises a frame, means on the frame for containing at least one vertical stack of said bodies, escapement means movably mounted in the frame, beneath said containing means, for releasing one body at a time therefrom to allow the body to fall from the stack, first and second traps mounted in the frame beneath the escapement means for movement between a first, body supporting position in which the traps are adjacent to one another to support a body released by the escapement means, and a second, body release position in which the traps are displaced from one another to allow a body supported thereby to fall therebetween and thereby to release the body, means for guiding the body released by the escapement means onto the traps when they are in their first position, so that the body spans the traps, receptacle means mounted on the frame beneath the traps for receiving and supporting a body released thereby, in an upstanding position and means for moving each trap, individually, from its first towards its second position, thereby to determine the vertical orientation in which the body is received in the receptacle means.

Thus if one of the traps is moved towards its second position before the other, the body will fall into the receptacle in one vertical orientation and if the other trap is first moved towards its release position the body will fall into the receptacle means, in the opposite vertical orientation.

The containing means may comprise a plurality of magazines each for supporting a stack of the bodies and it may be arranged that a body from a chosen stack can be released to fall upon the traps when these are in their first position. The bodies in one stack may be arranged in a different lengthwise orientations to those in another stack, and/or each magazine may contain elongate bodies of a different form.

The receptacle means may comprise a plurality of receptacles which can be selectively positioned beneath the traps.

For a better understanding of the invention and to show how it may be carried into effect, reference will now be made by way of example to the accompanying drawing in which:

FIG. 1A is a perspective view of a first electrical connector for use in the apparatus, in association with a ribbon cable to be terminated by means of the connector;

FIG. 1B is a similar view to that of FIG. 1A but showing a second electrical connector for use with the apparatus;

FIG. 2 is a top plan view of the apparatus;

FIG. 3 is an end view of the apparatus taken from the right hand side, as seen in FIG. 1;

FIG. 7 is a view taken on the lines 7—7 of FIG. 9;

FIG. 8 is a front view shown partly in section illustrating the operating of cable shearing blades of the apparatus;

FIG. 15 is a sectional view of the loading assembly showing drive means for connector orientation selection means of such assembly;

FIGS. 16 to 18 are fragmentary views showing part of the assembly as shown in FIG. 13 and illustrating the operation thereof;

FIGS. 19 and 20 are a front elevational view and a plan view, respectively, of a connector insertion assembly of the apparatus;

FIG. 21 is an elevational view of a shuttle assembly taken from the front, as seen in FIG. 1;

FIG. 25 is an elevational view of a lead ejector assembly of the apparatus taken from the left, as seen in FIG. 1; and FIG. 26 is a rear elevational view of the ejector assembly.

Figure 1:
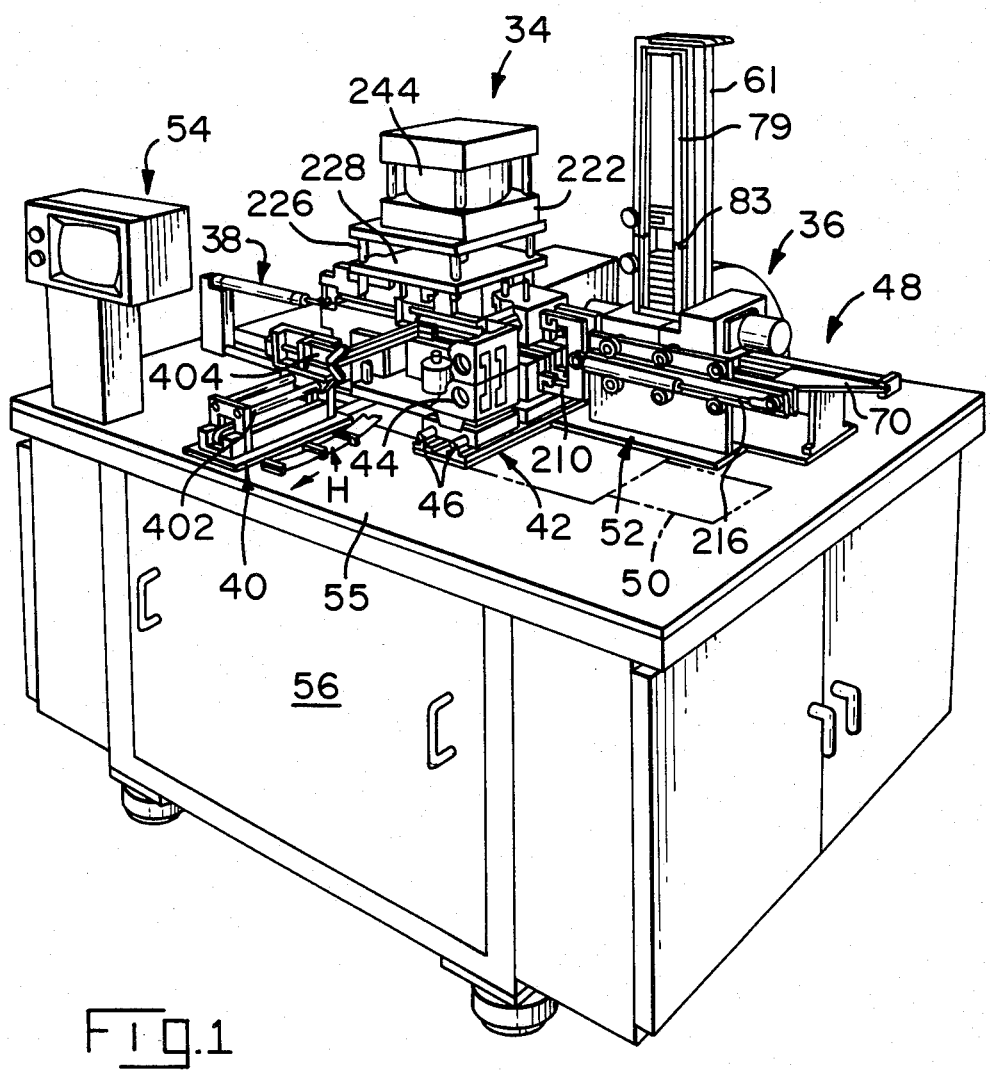
FIG. 1 is a diagrammatic perspective view of apparatus for the production of electrical harnesses comprising electrical connectors, mechanically and electrically connected to lengths of ribbon cable.

As shown in FIG. 1A, an electrical connector 2 comprises an insulating connector body 10 having a first end 4 and a second end 8, and a cover 12 which can be secured to the body 10 by means of latch arms 14 on the cover 12. The body 10 is formed with rows of cavities 16 each accommodating an electrical terminal 18 having a contact spring portion 20 and a forked, wire connecting portion 22. The cover 12 is formed with cavities 24 each for receiving one of the portions 22 of the terminals 18. If a ribbon cable 26 is positioned between the body 10 and the cover 12, as shown, and the cover 12 is then driven towards the body 10 to engage the arms 14 therewith, each forked portion 22 will be forced through the insulation of the cable 26 to receive a respective conductor 27 thereof so as to make electrical contact therewith, the cable 26 being sandwiched between the body 10 and the cover 12, and the body 10 and the cover 12 being firmly secured together by virtue of the latch arms 14 and by means of barbs on the forked portions 22 which engage the walls of the cavities 24 of the cover 12 according to the teaching of U.S. Pat. No. 3,820,055 which is incorporated herein by reference. Each of the cavities 16 opens into a board channel 28 in the body 10, which channel, in turn, opens into a mating face 30 of said body. A circuit board (not shown) can be inserted into the channel 28 so that each contact spring 20 engages a conductor on the board, whereby the terminals 18 are electrically connected to the conductors 27 of the cable 26.

The connector 2' shown in FIG. 1B, differs from the connector 2 described above with reference to FIG. 1, in that it is a post receptacle connector rather than a connector for receiving an edge of a circuit board. In the connector 2', the terminals 18 in the housing 10 have post receptacle portions 42 in place of the contact spring portions 20, the cavities 16 opening into the mating face 30 instead of communicating with a board channel.

The lead making apparatus will now be described in outline with reference to FIGS. 1 to 6. The apparatus comprises a press 34 for securing connectors 2 or 2' to a cable 26 fed intermittently through the press 34 by means of a cable feed assembly 36, a cable hitching device 37 for hitching the cable back and forward by a short length, a cable shear assembly 38 having shear means which are movable into and out of the press 34 and is actuable thereby to sever the cable 26, a finished lead ejector assembly 40, a shuttle assembly 42 comprising a shuttle 44 movable along rails 46, a pair of spaced connector loading assemblies 48 and 50, respectively, a connector inserter assembly 52 disposed between these assemblies, and a touch screen 54 for programming a microprocessor (not shown) of the apparatus.

Figure 5:
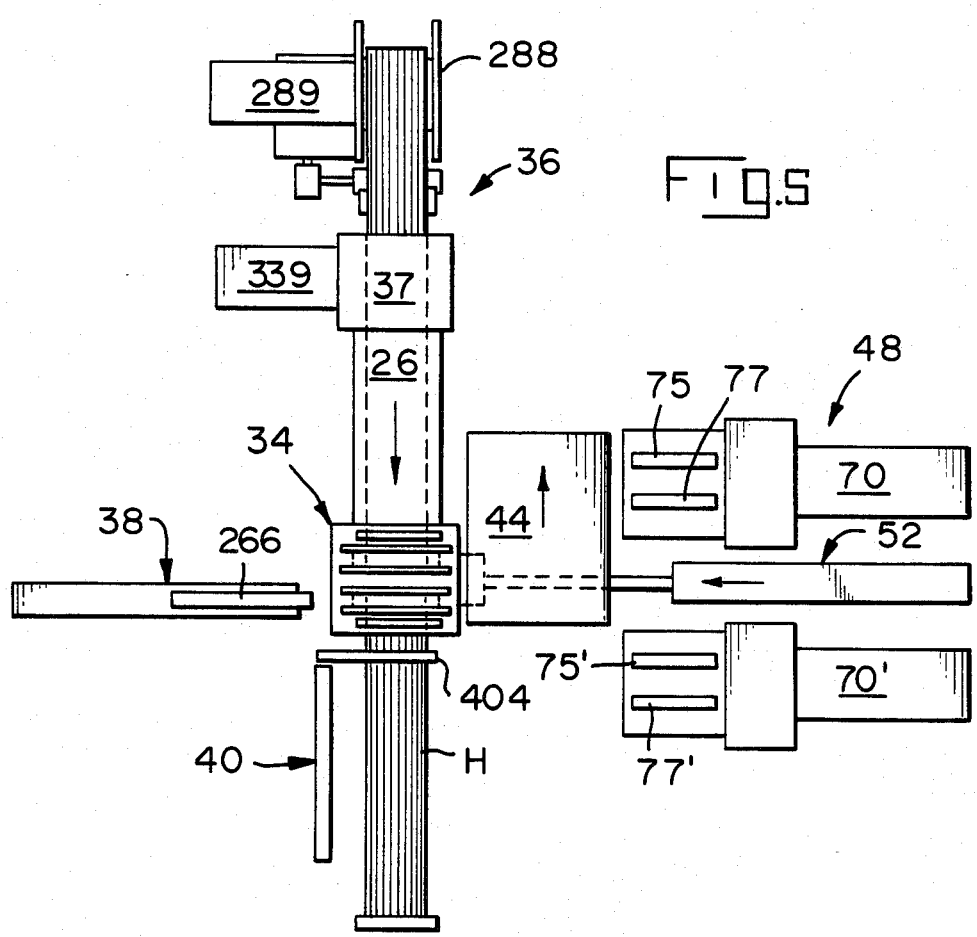
Figure 6:
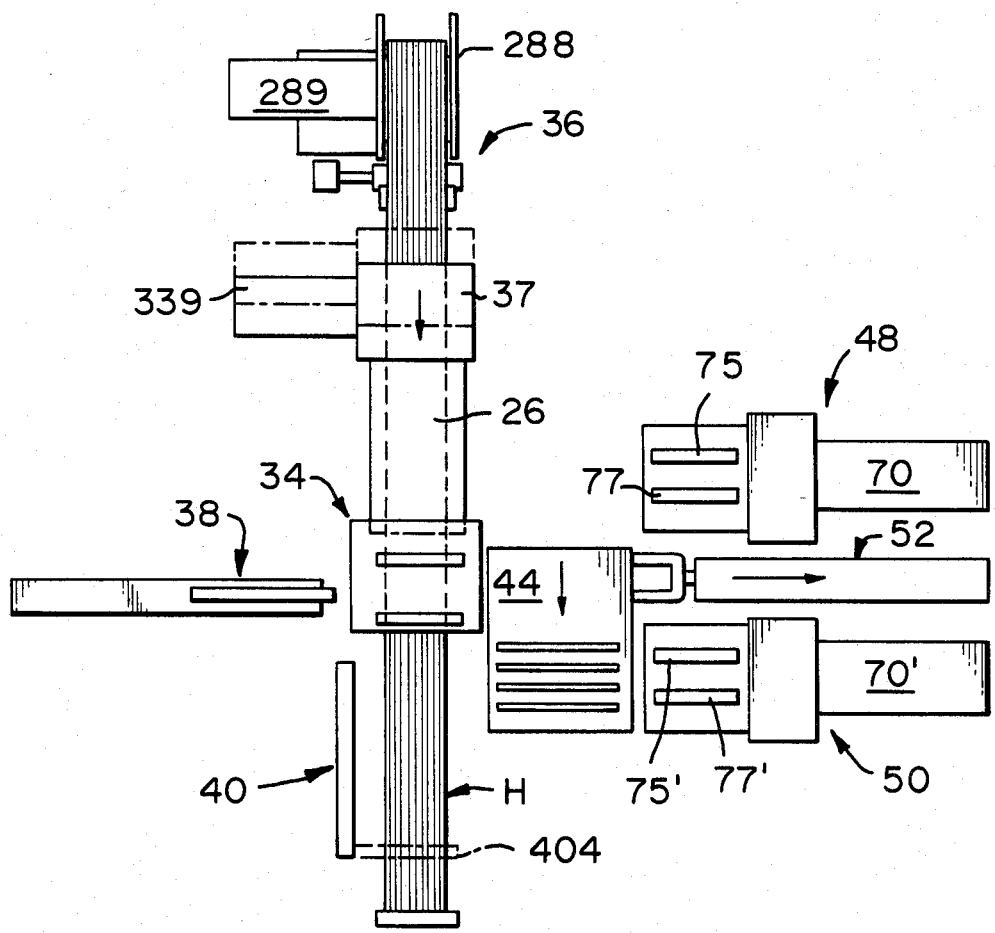
Figure 9:
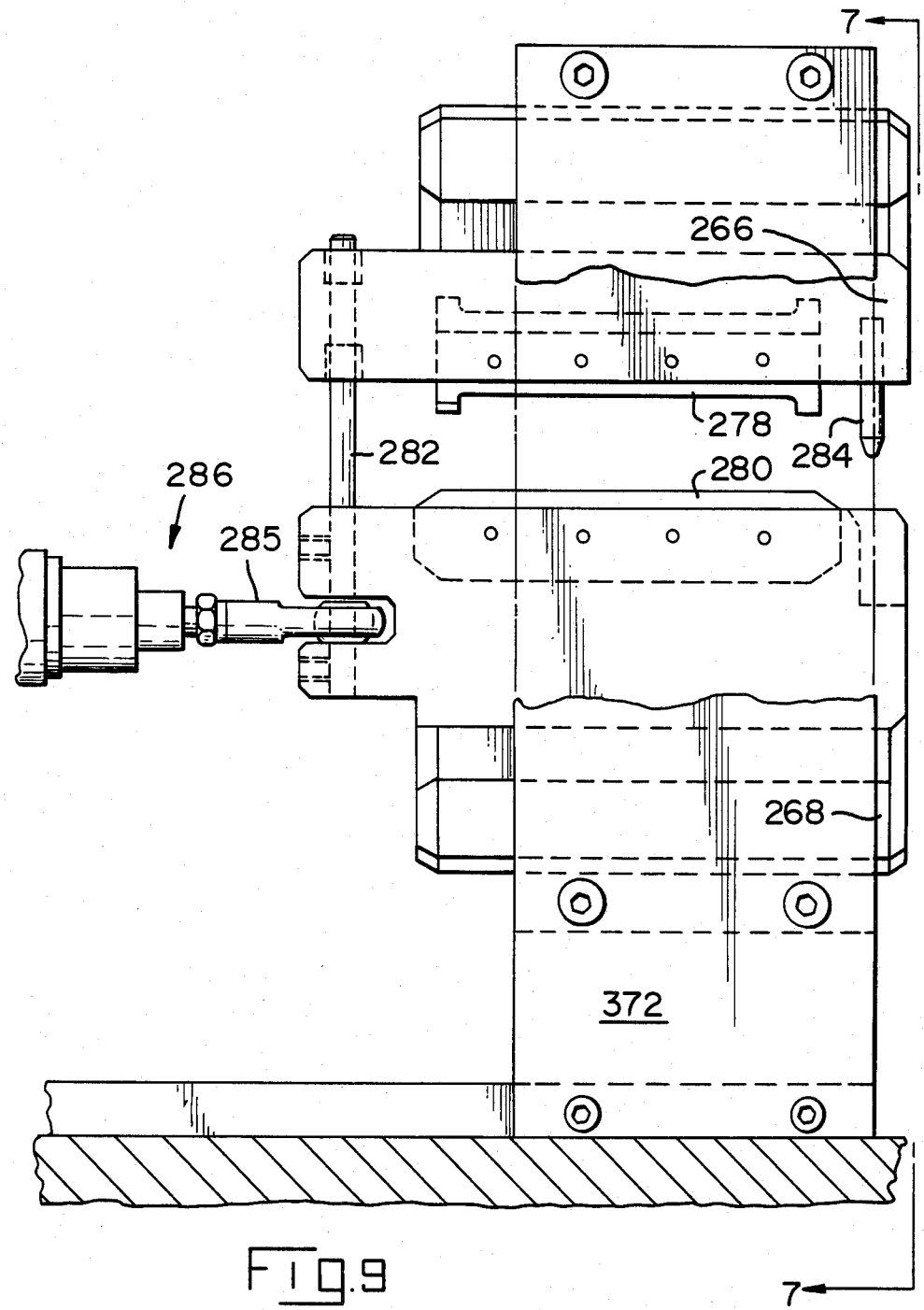
FIG. 9 is a front elevational view of a cable shearing assembly of the apparatus.

The parts just described are mounted on a top plate 55 of a work table 56. On the connector loading assembly 48 are vertical, gravity feed magazines 75 and 77 each containing a column of connectors 2, the connector loading assembly 50 having thereon a pair of similar magazines 75' and 77' each containing a column of connectors 2'. Each connector is arranged in its magazine with its cover 12 partially mated with its body 10 so that the body and the cover are readily detachable from one another. In each pair of magazines, the connectors in one magazine of the pair are arranged with their covers 12 facing the covers 12 of the connectors in the other magazine of the pair. Each loading assembly 48 and 50 is arranged to feed connectors into the shuttle 44 when it is in a predetermined position opposite to the loading assembly (FIG. 4), each connector being in an orientation, that is to say with its cover up or its cover down which can be predetermined by means described below according to the program. The shuttle 44 is then moved to a predetermined position opposite to the connector loading assembly 52 (FIG. 5) having separated the housing and the cover of each connector therein. The assembly 52 is then actuated to insert the connectors into the press 34 and the press is operated to mate the covers 12 and bodies 10 of the connectors with the cable 26 therebetween, thereby to terminate the cable to the connectors. As explained below, the cable is sheared by means of the shearing assembly 38, is advanced by the assembly 36 is clamped, has connectors secured thereto and is hitched by the device 37, according to a predetermined sequence, so that individual harnesses with connectors 2 and/or 2' thereon are consecutively produced, each completed harness being ejected by means of the assembly 40 (FIG. 6). The length of each harness, the number and type of connectors that it comprises, and the relative orientations of these connectors can be predetermined by setting up a desired harness making program on the touch screen 54.

For starting up the apparatus, a short length (e.g. 4 inches) of cable is first fed through the press by means of the cable feed assembly 36, the cable is then "registered", by means described below, to ensure that it is correctly laterally positioned, cable clamps, described below in the press 34 and on the device 37 are then closed about the cable 26, a cable clamp (comprising a pair of jaws) of the ejection assembly 40 is closed about the cable, the cable shearing assembly 38 is moved into the press 34 which is then cycled to shear the cable, the shearing assembly 38 is retracted from the press 34, the cable clamps of the press are opened, the assembly 40 is operated to eject the scrap length of cable from the apparatus, and the device 37 is operated to hitch back, that is to say, to retract the cable 26 by a short distance to bring its severed end portion into line with the insertion assembly 52.

Figure 4:
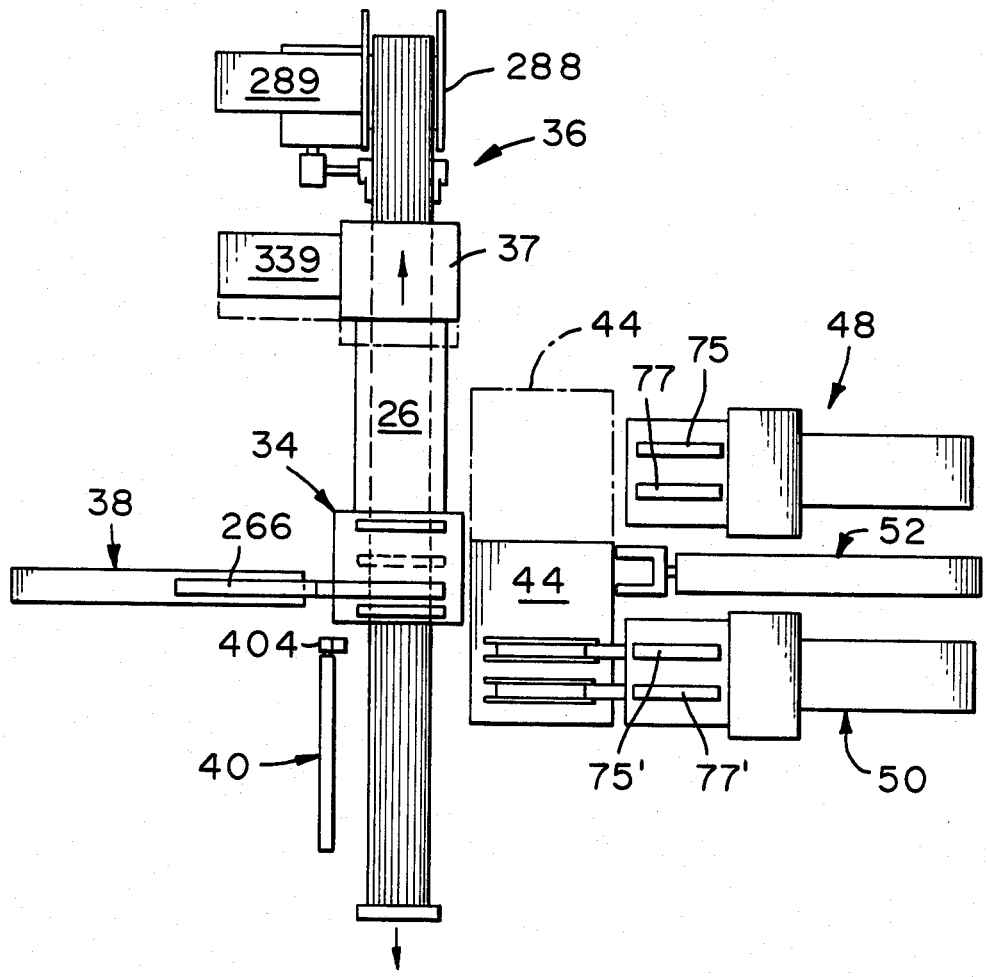
FIGS. 4 to 6 are schematic plan views of the apparatus illustrating respective stages in its cycle of operation.

A cycle of the apparatus in the production of a harness having a connector secured to each end, that is to say a jumper cable or "end harness", will now be described in outline with particular reference to FIGS. 4 to 6. The assembly 52 is operated to insert into the press 34, a connector which has already been loaded into the shuttle 44 by a predetermined one of the loading assemblies 48 and 50, the shuttle 44 being positioned as shown in full lines in FIG. 4. The press 34 is then cycled to secure the connector to the cable 26, and the assembly 52 is returned, all the clamps are opened and the cable 26 is fed forward by the desired lead length of the harness to be manufactured. The clamps of the press and the assembly 36 are closed, the cable is sheared by the assembly 38, these clamps remain closed, the cable is hitched back by the device 37 (FIG. 4), the clamp of which is still closed, the assembly 52 is operated to insert two further connectors which have been loaded into the shuttle 44 at by the assembly 48 or 50, into the press 34 (FIG. 5), the press 34 is cycled to secure one of these two connectors to the secured end of the cable 26 and the other end to the severed end of the newly formed lead, the assembly 52 is returned to its retracted position, the clamps of the press, and of the assembly 40 are opened, and the device 37 is operated to hitch the cable 26 forward (FIG. 6), that is to say to advance it by a short distance for the application thereto of two further connectors, and the assembly 40 is operated to eject the finished harness H as shown in FIG. 6.

For making a "daisy chain" harness, that is to say a harness with further connectors secured between its ends, as well as at its ends, the cable 26 is repeatedly fed forward by the desired spacings between the further connectors and these are then applied to the cable, intermediate the application of the end connectors of the harness.

The harness making apparatus will now be described in detail.

THE CONNECTOR LOADING ASSEMBLIES

Figure 13:
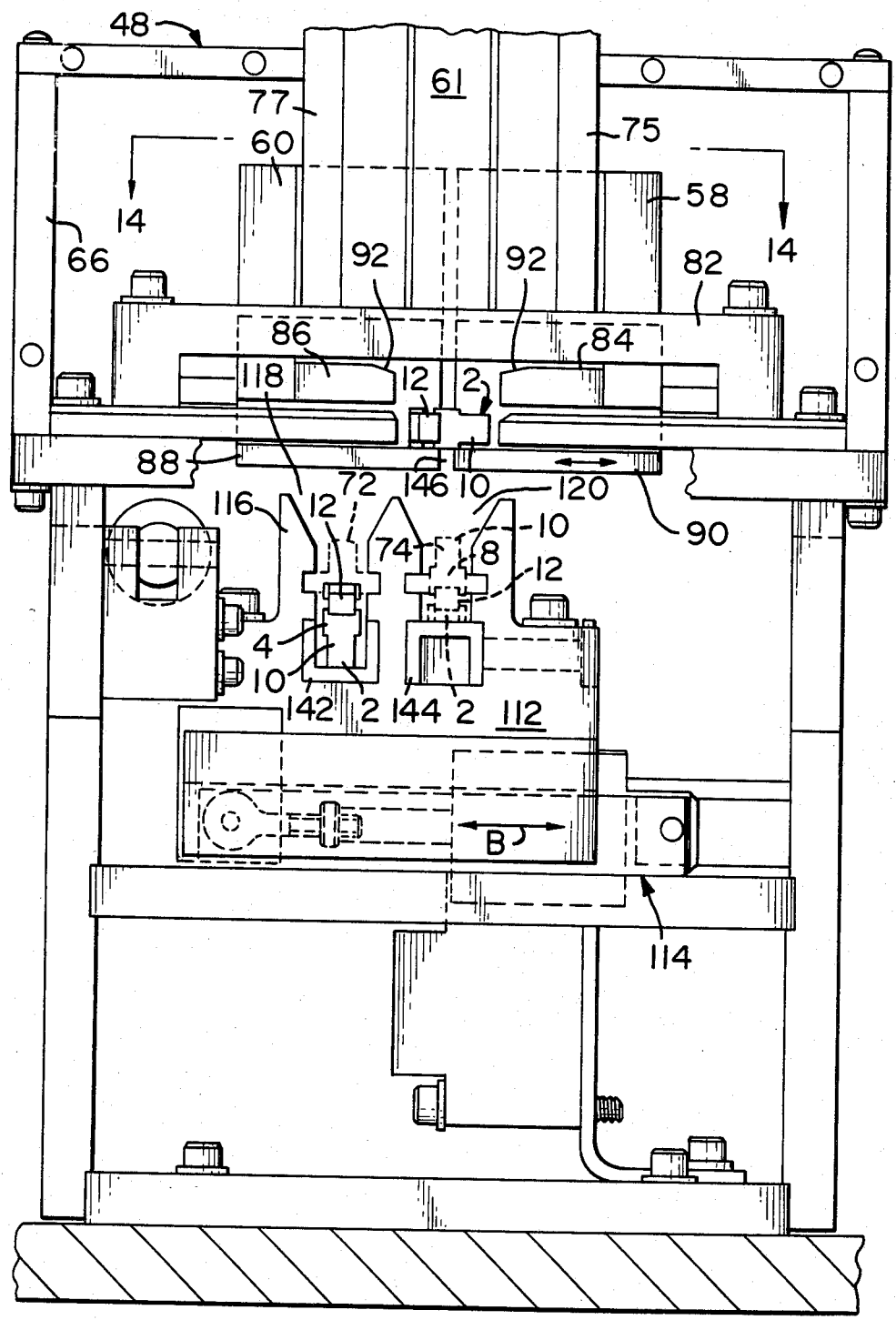
FIG. 13 is a front elevational view of a connector loading assembly of the apparatus.

The connector loading assembly 48, with which the assembly 50 is identical, will now be described with reference to FIGS. 2, 13, 13A and 14 to 18. The assembly 48 comprises, as best seen in FIG. 2, a first frame 66 carrying the magazine supports 58 and 60 in which are reservoir magazines 75 and 77 between which is a vertical separator 61, and a second frame 68 supporting an insertion ram unit 70 comprising insertion rams 72 and 74 arranged to be driven in reciprocating motion in a direction towards and away from the path of the shuttle 44, by means of a piston and cylinder unit 76. In FIGS. 2 and 3 those parts of the assembly 50 which correspond to the parts mentioned above, of the assembly 48 are similarly referenced but with the additon of a prime symbol. As shown in FIG. 13, the loading rams 72 and 74 are of cruciform cross-section. These rams may, however, be of rectangular cross-section.

Figure 13A:
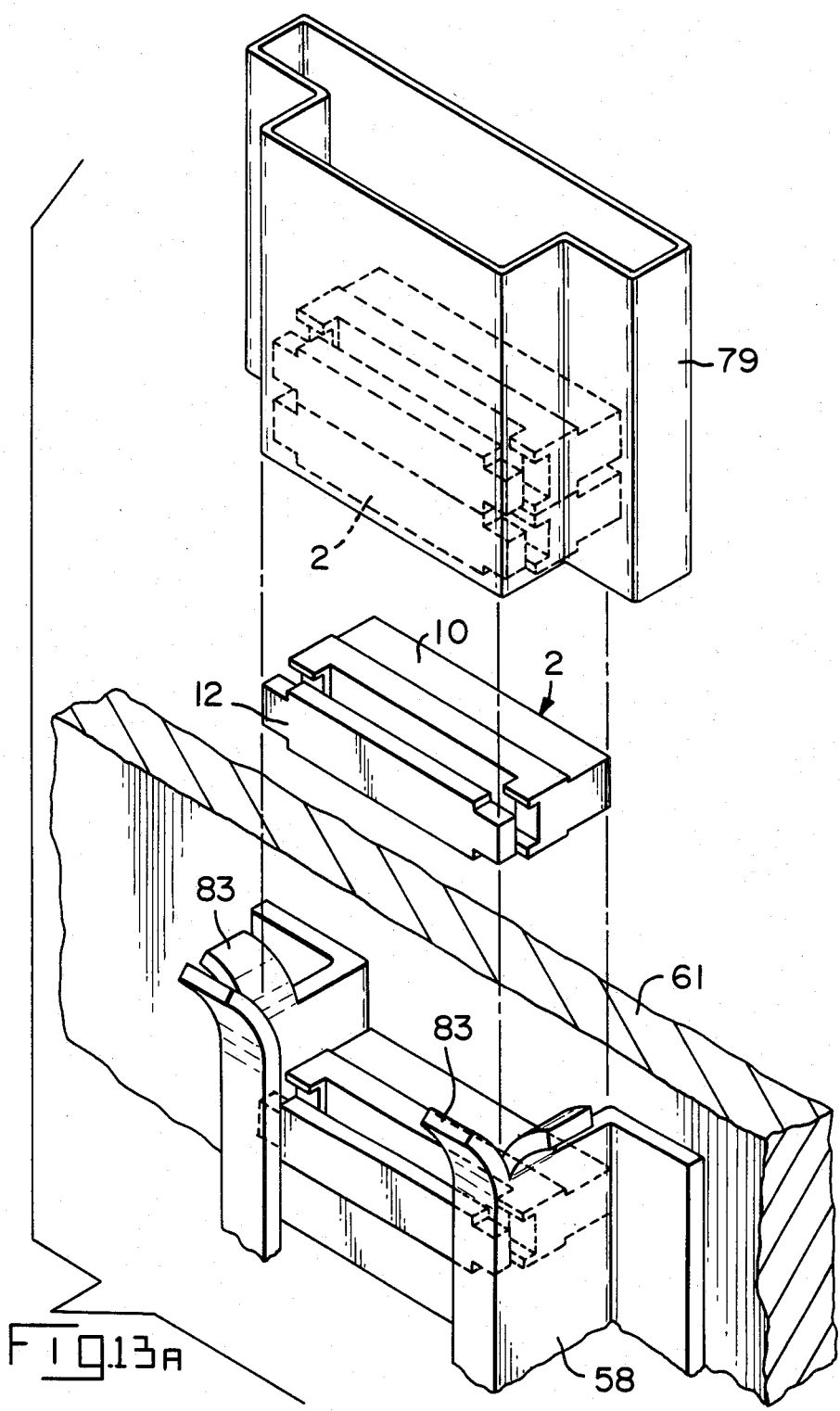
FIG. 13A is a fragmentary perspective view showing details of the loading assembly.
Figure 14:
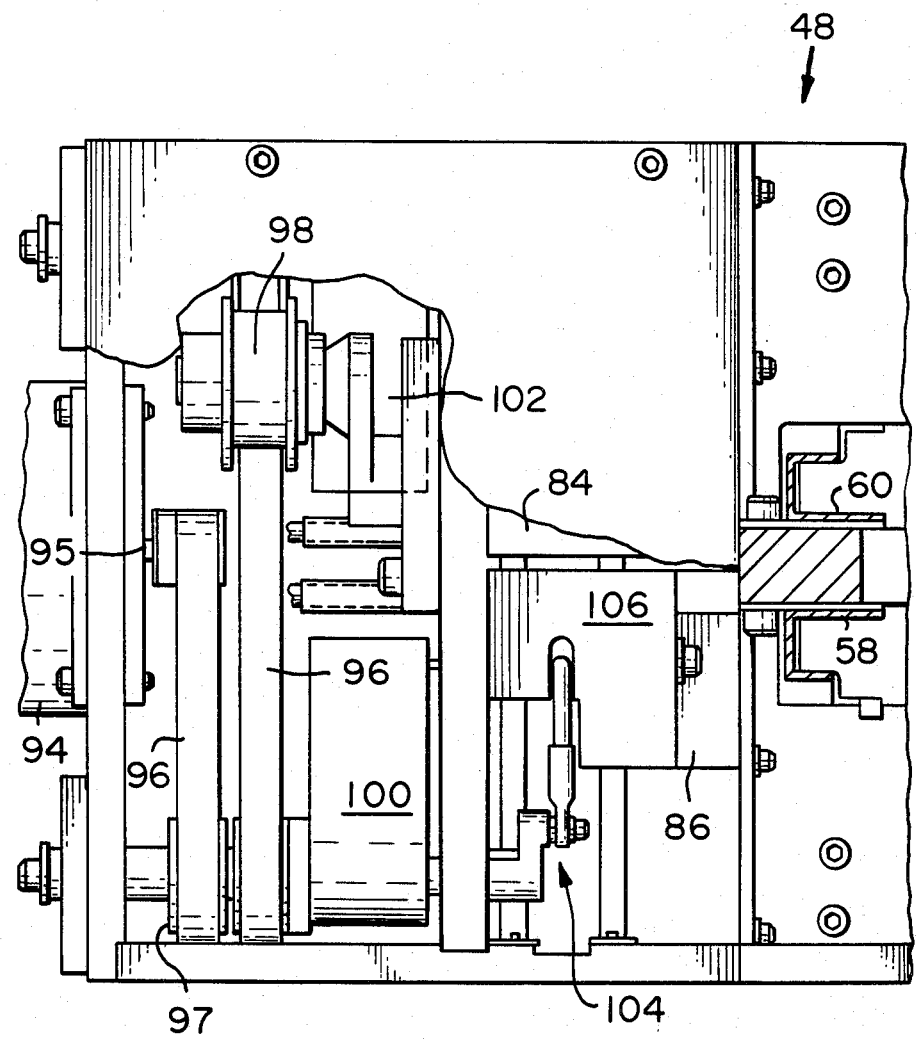
FIG. 14 is a view taken on the lines 14—14 of FIG. 13.
Figure 17:
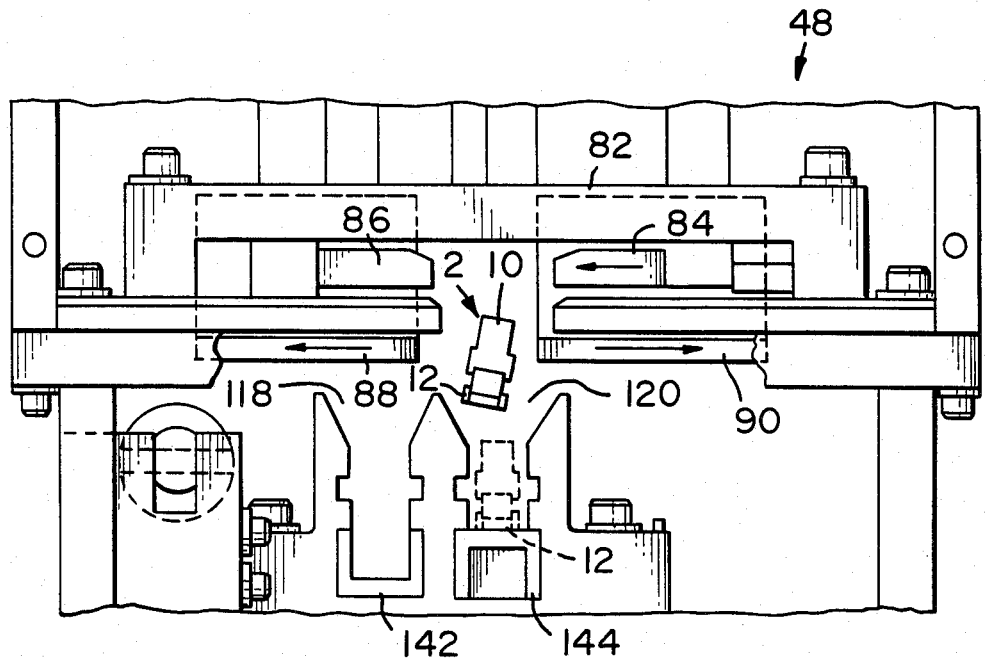
Figure 18:
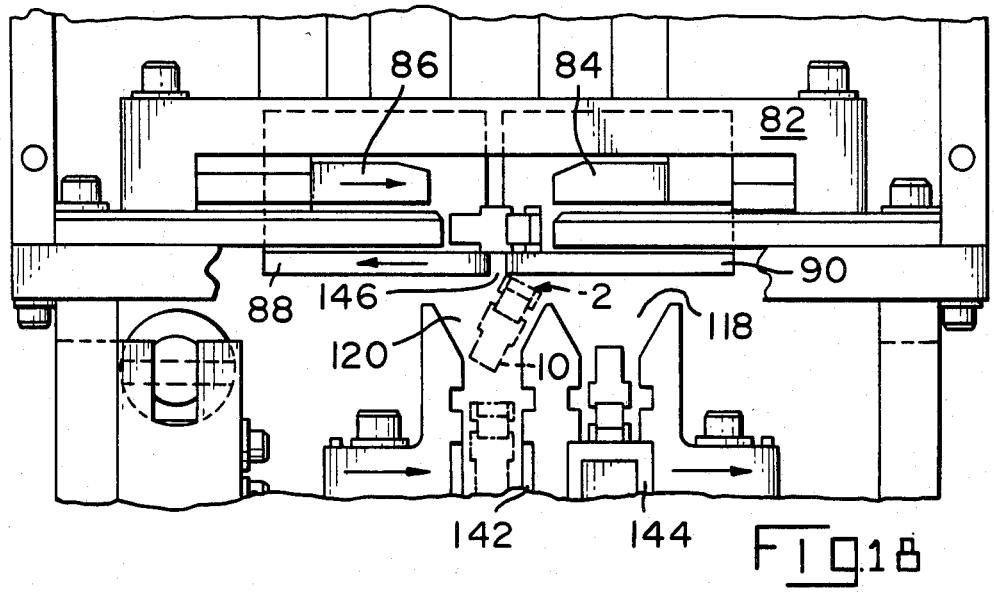

The connectors 2 are received in the magazine 75 with their ends 4 facing the reader, those in the magazine 77 having their ends 8 facing the reader (as seen in FIG. 13). The magazine supports 58 and 60 are, in turn, supported by a subframe 82. The magazines 75 and 77 are open at their lower (as seen in FIG. 13) ends. At their upper ends (as best seen in FIG. 13A) the reservoir magazines 75 and 77 have ears 83 providing receptacles receiving plastic clips 79 each containing 50 connectors and communicating with the reservoir magazines 75 and 77. Beneath the lower ends of each of the magazines 75 and 77, are escapements 84 and 86 respectively, each of which is movable between an advanced position in which it is shown in FIG. 13, thereby obturating the opening in said lower end, and a retracted position in which it is clear thereof to allow a connector 2 to fall from the magazine, guided by a ramp 92 on the escapement, onto connector orientating traps 88 and 90, so as to span them as shown in FIG. 13. The traps 88 and 90 are sequentially retractable from the advanced positions in which they are shown in FIG. 13, in which positions they support the fallen connector 2. When the trap 88 is retracted first, the connector 2 falls between the traps 88 and 90 (as shown in FIGS. 16 and 17) with its cover 12 down, and if the trap 90 is retracted first, the connector 2 will fall with its cover 12 up (FIG. 18). The gate means comprised by the escapements 84 and 86 and the traps 88 and 90 are operated by an electric motor 94 (FIGS. 14 and 15) the spindle 95 of which drives a toothed timing belt 96 which is passed around a pulley 97 and an idle roller 98 to drive single revolution clutches 100 and fractional cycle clutches 102, there being a clutch 100 for controlling the movement of each escapement 84 and 86 and a clutch 102 for controlling the movement of each trap 88 and 90. The clutches 100 are connected to the escapements through linkages 104 and sliders 106, the clutches 102 being connected to the traps through linkages 108 and sliders 110.

Beneath the traps 88 and 90 as shown in FIG. 13, is an indexing carriage 113 driven by a short stroke or "pancake", indexing piston and cylinder unit 114, and having thereon a plastics molding 116 defining upwardly open, connector receiving cavities 118 and 120 in which are rectangular adaptor inserts 122 and 144, respectively, arranged in opposite vertical orientations. The carriage 112 is movable, in the directions of the double arrow B in FIG. 13, by the unit 114 selectively to position the cavities 118 and 120 beneath the space 146, defined between the traps 88 and 90 when these are in their advanced positions.

As shown in FIGS. 16 to 18, when a cavity 118 or 120 is beneath the gap 146 and the traps 88 or 90 have been appropriately operated, the connector 2 will fall into the cavity with its cover up or down according to the program. The adaptor inserts 142 and 144 ensure that each connector is supported in its cavity, with the gap between its body 10 and its cover 4 at the same height, and in alignment with the leading end of the appropriate ram 72 or 74. When the connectors 2 or 2', as the case may be, are in the cavities 118 and 120 in the connector loading assembly 48 or 50 as the case may be, the corresponding drive unit 76 or 76', as the case may be, can be actuated to drive the connectors into the shuttle. Where the connectors are to be vertically oriented other than as shown in FIGS. 13, 17 and 18, the position of an insert 142 or 144 can be reversed manually.

Each of the assemblies 48 and 50 can be actuated to drop a connector into only one of the two cavities, in a chosen vertical and longitudinal orientation, according to the program.

THE SHUTTLE ASSEMBLY

The leading ends of the rams 72 and 74, are engageable in transverse guide slots 135 in the molding 116 and can thus pass through the molding 116 to eject the connectors in the cavities 118 and 120, from the loading assembly into the shuttle 44. Where the rams 72 and 74 are of rectangular cross-section, the slots 135 are not provided.

Figure 22:
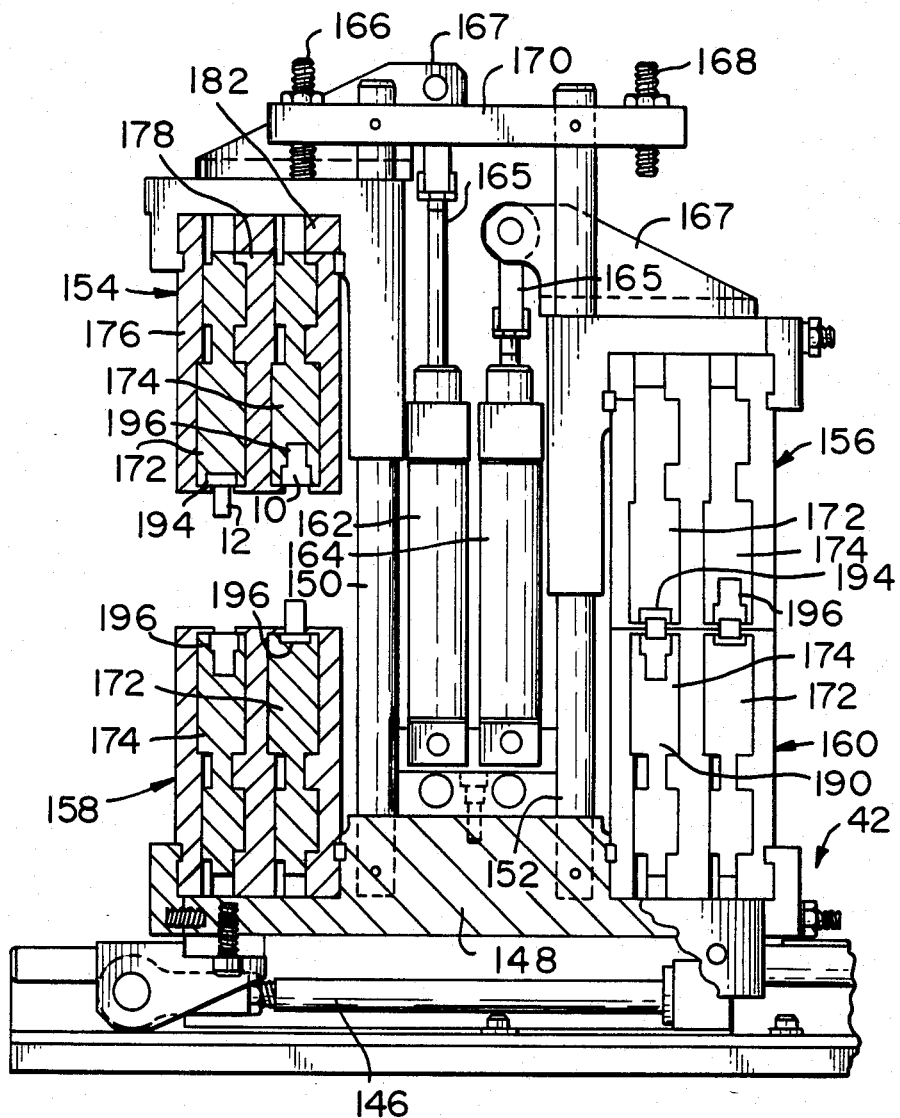
FIG. 22 is an elevational view of the shuttle assembly taken from the right as seen in FIG. 1.

The shuttle assembly 42 will now be described with reference to FIGS. 2 and 21 and 22. The shuttle 44 is arranged to be driven along the rails 46 by means of a piston and cylinder unit 146 therebeneath, between positions determined by the program.

Figure 23:
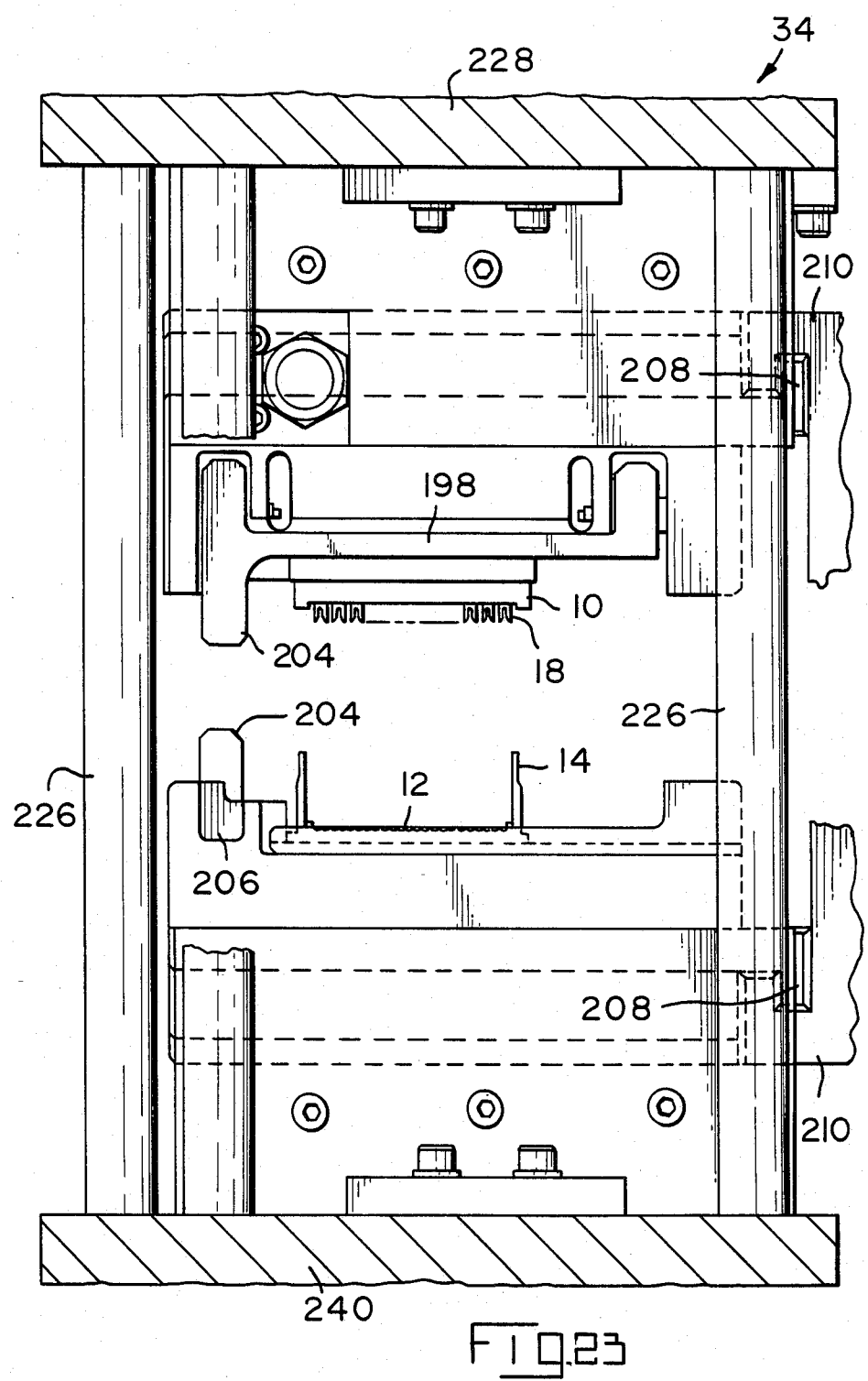
FIG. 23 is a fragmentary rear elevational view of a press of the apparatus.

The shuttle 44 comprises a base 148 from which upstand rods 150 and 152. The rod 150 supports, for vertical sliding movement therealong, an upper front connector separator 154, the rod 152 supporting an upper rear connector separator 156. Mounted on the base 148, beneath, and in alignment with the separator 154 is a lower front separator 158, a lower rear separator 160 being mounted on the base 148, beneath, and in alignment with, the separator 156, as shown in FIG. 22. Piston and cylinder units 162 and 164, respectively, fixed to the base 148, have piston rods 165 connected to clevises 167 on the upper separators and are arranged to drive the separator 154, towards and away from, the separator 158 and the separator 156 towards, and away from, the separator 160, respectively. FIG. 22 shows the separator 154 in a raised position remote from the separator 158, and the separator 156 in a lowered position in engagement with the separator 160. Adjustable stops 166 and 168 are provided on a bar spanning the rods 150 and 152 for limiting the upper end positions of the respective separators 154 and 156. Each connector separator comprises, as shown in FIG. 22, a pair of connector holding fixtures 172 and 174, respectively, mounted for horizontal sliding movement between guide plates 176, 178 and 182, Each fixture 172 of an upper separator, being aligned with the fixture 174 of the aligned lower separator. The fixtures 172 are provided with longitudinal grooves 194 into each of which a cover 12 can be inserted by an appropriate one of the rams of the shuttle loading assembly 48 when the shuttle 44 is positioned so that that ram is in alignment with the groove 194, the fixtures 174 being provided with longitudinal grooves 196 into which a connector body 10 can be similarly slid by the appropriate ram of the loading assembly 48 or 50. These feeding operations can only occur when the upper and the lower separators are in a closed position, as shown on the right hand side of FIG. 22. As shown in FIGS. 21 and 23, each holding fixture is provided with a spring clamp 198 serving to hold the cover 12 or body 10 in its groove 194 or 196, respectively, each clamp being provided with a cam follower portion 204 which is engageable with a ramp surface 206 of the opposite fixture, when an associated upper and a lower separator are in their closed, i.e. engaged, position, to release from their clamps any cover and connector body in the holding fixtures of the engaged upper and lower separators. As the clamps are opened in the closed position of the separators, the bodies 10 and covers 12 can readily be fed into the grooves 194 and 196 by the rams of the connector loading assembly 48 or 50. As mentioned above, the holding fixtures are loaded with covers 12 and bodies 10, when the upper and lower separators are in a closed position. Each holding fixture, has at its end remote from the press 34, a hook for engagement with a corresponding, and oppositely directed hook 210 of the insertion assembly 52, which is arranged to drive the holding fixtures into the press 34. The hooks 208 are only engageable with the hooks 210 when the separators of a pair of upper and lower separators have been moved to their open position so as to separate the covers 12 from the bodies 10 held therein. The position of the shuttle 44 laterally of the rails 46 is monitored by a proximity sensor 211.

THE CONNECTOR INSERTION ASSEMBLY

The insertion assembly 52 will now be described with reference to FIGS. 19 and 20. The assembly 52 comprises a frame 212 in which a front inserter 214 and a rear inserter 216 are mounted for horizontal sliding, reciprocating, movement between rollers 218, each inserter 214 and 216 being independently driven by a piston and a cylinder unit 220 at its end nearest the press, each inserter is provided with two of the hooks 10 mounted in vertically spaced relationship on a crosspiece 222 as best seen in FIG. 19. As will be appreciated, the inserters 214 and 216 can be operated to drive either one opposed pair of holding fixtures or both opposed pairs of holding fixtures of a pair of separators, into the press 34 and to return the, or each, holding fixture so driven, into its respective separator; when the separators of the pair are in their open position.

THE PRESS

Figure 23A:
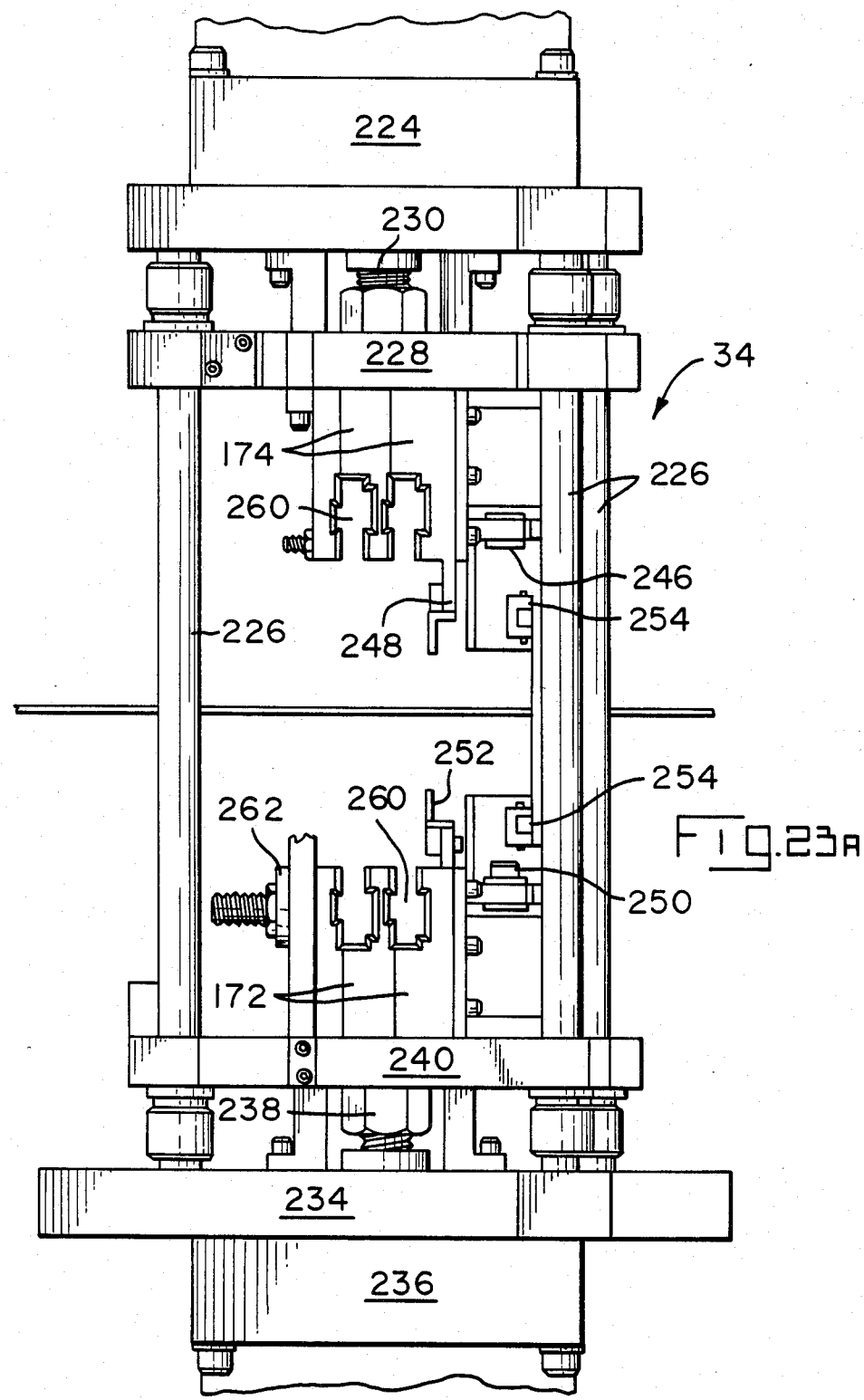
FIG. 23A is an elevational view of the press taken from the left as seen in FIG. 1.
Figure 24:
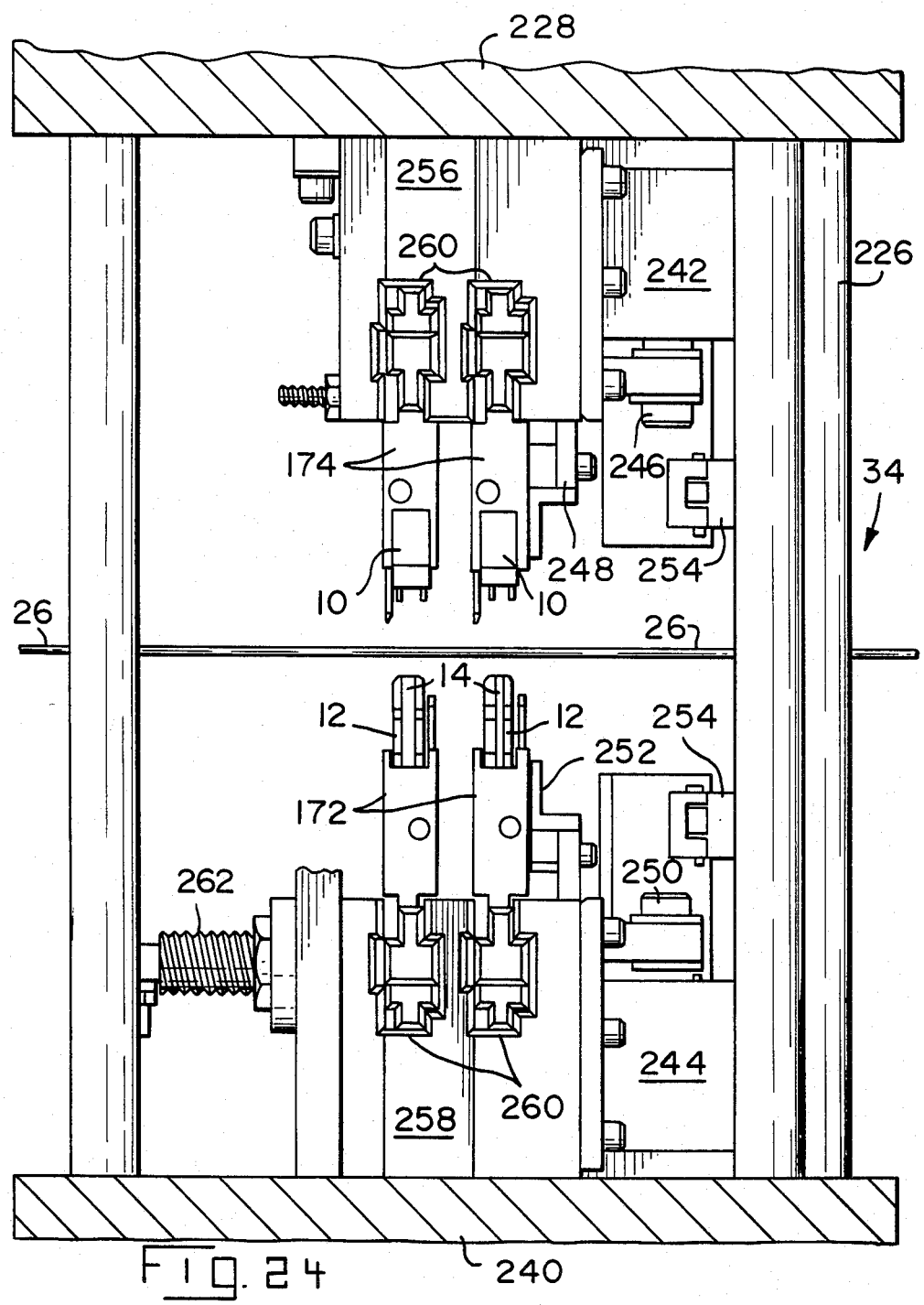
FIG. 24 is an elevational view of the press taken from the left as seen in FIG. 1 showing connector holding fixtures in the press.

The press 34 will now be described with reference to FIGS. 1, 11, 23, 23A and 24. As shown in FIG. 1, the press 34 comprises a support structure 222 containing a press drive piston and cylinder unit 224 which is in turn supported on press posts 226 upon which is slidably mounted an upper press platen 228 connected to the piston rod 230 of the unit 224. The posts 226 are fixedly mounted to a base 234 beneath which is a lower press drive piston and cylinder unit 236 having a piston rod 238 connected to a lower press platen 240 slidably mounted on the rods 226, all as best seen in FIG. 23A. Fixedly mounted between the platens are upper and lower front cable clamp piston and cylinder drive units 242 and 244. The unit 242 has a piston rod 246 connected to an upper front cable clamping jaw 248, the unit 244 having a piston rod 250 connected to a lower front cable clamping jaw 252, limit switches 254 being provided for detecting the advanced positions of the piston rods 246 and 250. Affixed to the platens 228 and 240, respectively, are tool holders 256 and 258, respectively, each having grooves 260, each groove being dimensioned slidingly to receive one of the holding fixtures 172 and 174 to be driven thereinto by the inserters 214 and 216. Shot pin units 262, one of which is shown in FIG. 24, are provided for aligning the holding fixtures longitudinally in the grooves 260. The drive units 226 and 236 are actuable to close the platens 228 and 240 towards one another to mate connector bodies 10 and their covers 12 about the cable 26, when the holding fixtures have been driven into the grooves 260 of the tool holders 256 and 258 by the inserters 214 and 216. The cable clamping jaws 248 and 252 can be advanced by their respective drive units 242 and 244 to clamp the cable 26 for this operation. As shown in FIG. 8, the platens 228 and 240 are provided with grooves 264 for slidably receiving shear blade holders 266 and 268 of the cable shearing assembly 38.

THE CABLE SHEARING ASSEMBLY

The assembly 38 will now be described with reference to FIGS. 2 and 7 to 9. The assembly 38 comprises a base 270 supporting a frame plate 272 to which are fixed upper and lower holsters 274 and 276 respectively, slidably receiving respective upper and lower shear blade holders 266 and 268 carrying shear blades 278 and 280, respectively. Rods 282 and 284 are provided for guiding the blade holder 266 for movement towards the blade holder 268. The blade holder 268 is connected to the piston rod 285 of a drive piston and cylinder unit 286 for driving the blade holders 266 and 268, from the holsters 274 and 276 into the grooves 264 of the press platens 228 and 240, respectively, and for returning the blade holders 266 and 268 into the holsters. When the cable 26 is to be sheared, the drive unit 286 is actuated to drive the blade holders 266 and 288 into the grooves 264 and the drive unit 226 is actuated to drive the platen 228 towards the platen 240 whereby the cable 26 is sheared between the blades 278 and 280 as shown in FIG. 8. The press drive unit 236 is not actuated at this time. The unit 226 is then actuated to raise the platen 228 and the unit 286 is actuated to return the blade holders 226 and 268 to the holsters 274 and 276, respectively.

THE CABLE FEED ASSEMBLY

Figure 10:
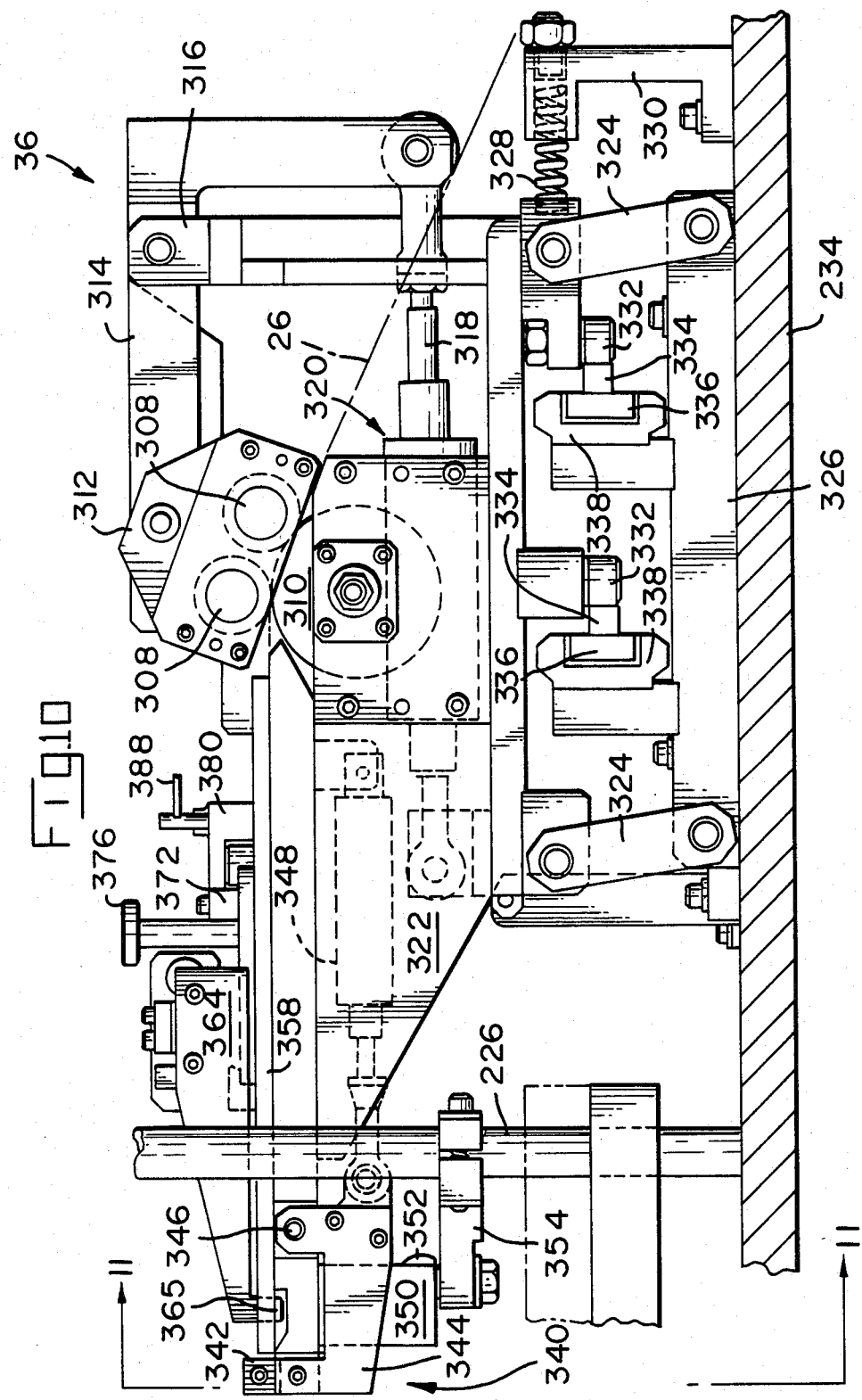
FIG. 10 is a side elevational view of part of a cable feed and hitching assembly of the apparatus.
Figure 11:
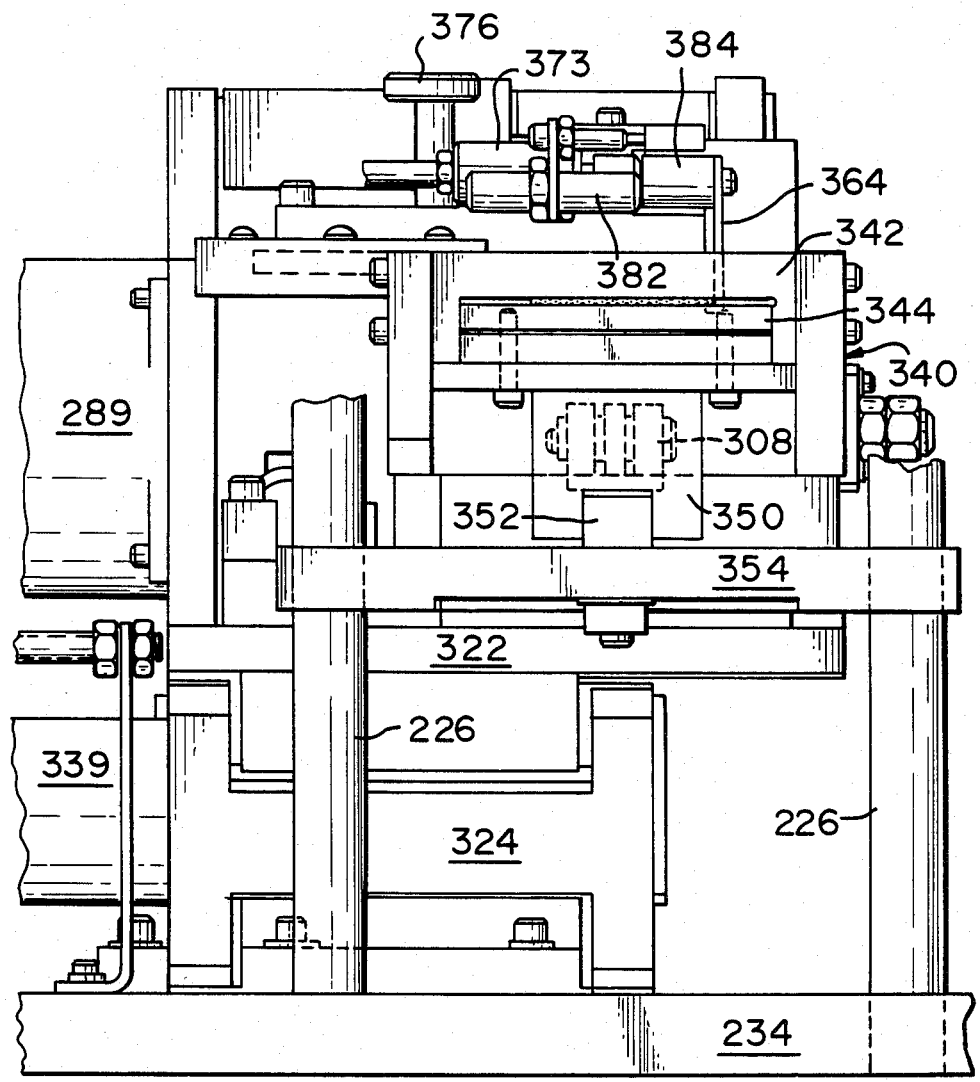
FIG. 11 is a front elevational view of the cable feed and hitching assembly taken on the lines 11—11 of FIG. 10.

The cable feed assembly 36 will now be described with reference to FIGS. 2, 3 and 10 to 12. As shown in FIG. 3, a cable reel 288 driven by a motor 289 and provided with a supply of the cable 26 is mounted on a frame 299 attached to the table 56. The cable passes over a first idle roll 304 and a second idle roll 300 on a rocker arm 302 which is swingable to actuate means for stopping the motor 289 if the cable 26 is unduly tensioned. From the roll 300, the cable 26 passes through a detector device 306 for detecting any splice or other undesired irregularity in the cable and which is arranged to stop the feed of the cable if such is detected. From the device 306, the cable passes between pivotally mounted idle rolls 308 and a driven roll 310, as shown in FIG. 10. The rolls 308 are mounted in a clevis 312 pivoted to a crank 314 which is in turn pivoted to a support 316 and is pivotally connected to the piston rod 318 of a piston and cylinder unit 320 which is actuable to engage the rolls 308 with the cable 26 and to raise them therefrom. The unit 320, the support 316 and the rolls 310 are mounted to a cable hitch rocker frame 322 which is in turn mounted for horizontal rocking movement, on parallel links 324 connected to a base 326. The frame 322 is connected via an adjustable return spring 328 to a support 330 fixed with respect to the base 326. Depending from the frame 322 are cam followers 332, which cooperate with cams 334 on slides 336 which are slidable back and forth in gibs 338 by means of an air motor 339 (FIG. 12), thereby to cause the cable 26 to be hitched back or forward as required. On the frame 322 is a cable clamp 340 comprising clamping jaws 342 and 344, best seen in FIG. 11, the jaw 342 being fixed, and the jaw 344 being pivoted to the frame 322 at 346. The clamping surface of the jaw 344, which is serrated so as to be compatible with the contour of the cable 26, is movable towards and away from that of the jaw 342 by means of a piston and cylinder unit 348. A clevis 350 secured to the frame 322 carries a roll 352 which runs on a bracket 354 spanning two of the posts 266. The roll 352 cooperates with the bracket 354 to guide the frame 322 during its hitch back and hitch forward movements. These movements are of course carried out with the clamp 340 closed about the cable 26.

Figure 12:
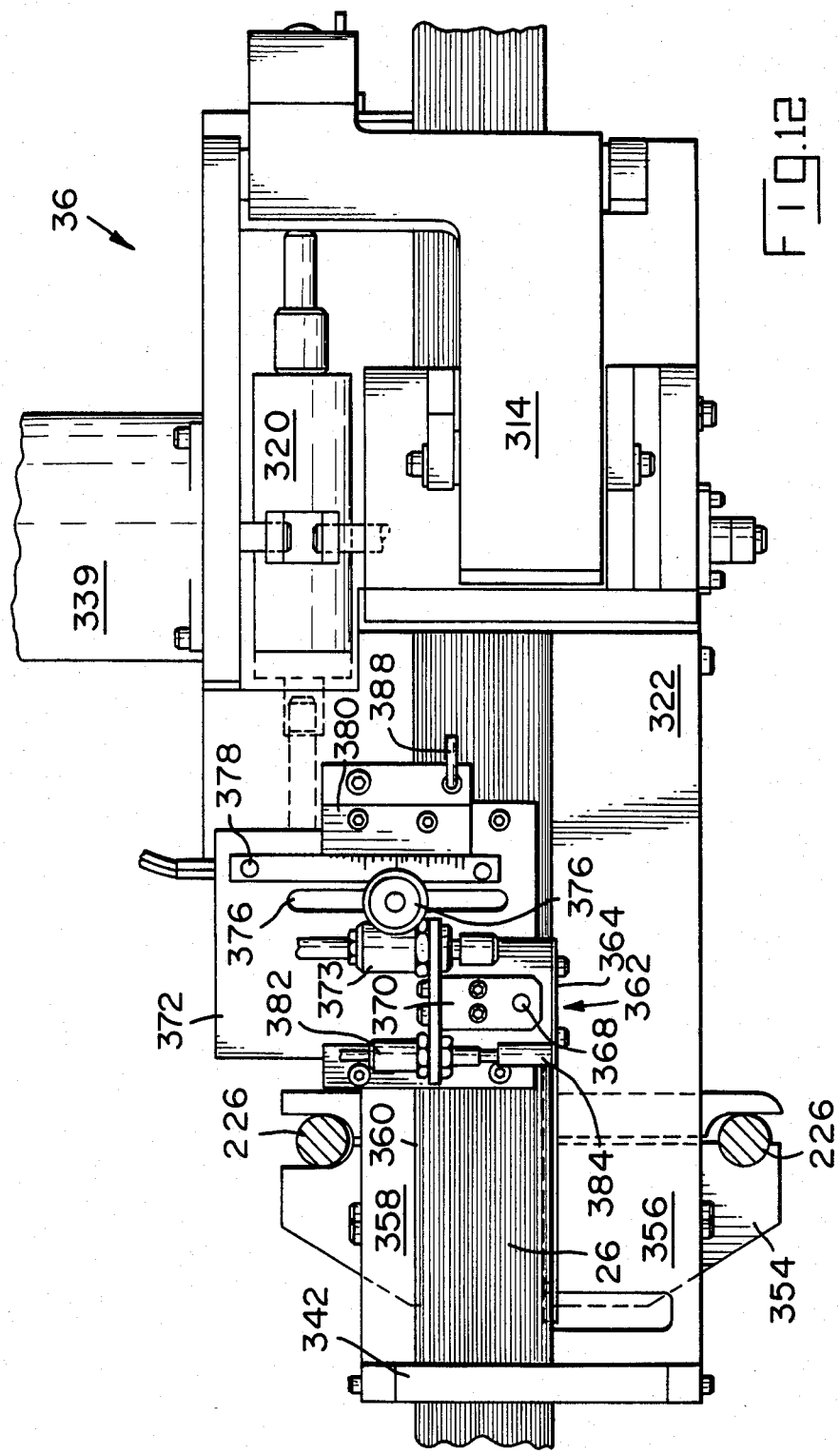
FIG. 12 is a plan view of FIG. 10.

As best seen in FIG. 12, the cable 26 runs from the rolls 308 and 310 over a cable support surface 356 of the frame 322 provided with a plate 358 defining a cable position reference surface 360 which together with a cable sweep 362 and the clamp 340 constitutes a cable register. The sweep 362 comprises a cable sweeping arm 364 depending from a top plate 366 pivoted at 368 to a block 70 pinned to a carriage 372. The carriage 372 has a slot 374 extending at right angles to the cable feed direction and receiving a locking screw 376. By loosening the screw 376, the carriage can be freed for movement in the lengthwise direction of the slot 374. By pulling up a handle 388, a block 380 bearing a bench mark can be freed to move along a scale 378 on the carriage 372 adjust the sweep 364 relative to the surface 360, for cable width. The sweep can be pivoted to move its working end 365 towards the surface 360 by means of an air motor 373 to an extent limited by an adjustable stop 382, engageable with a projection 384 on the sweep 364.

THE HARNESS EJECTOR ASSEMBLY

The ejector assembly 40 will now be described with reference to FIGS. 2, 25 and 26. The assembly comprises a base 386 to which are fixed supports 388 and 390 carrying a drive piston and cylinder unit 392 to each side of the piston of which is secured a wire rope 394 which runs on pulley wheels 396. A bracket 398 secured to the cable 394 is fixed to a jaw carrier 400 which is slidable along rails 402 mounted in the supports 388 and 390, towards and away from the press 34, by appropriate actuation of the unit 392. The jaw carrier 400 comprises a jaw frame 401 on which are mounted a pair of jaws 404 having at one end working surfaces 405 for gripping the cable 26, the other end of each jaw being connected to a jaw pivot shaft 406 rotatably supported in the frame 401. Each shaft 406 is connected fixedly to one end of a link 412 the other end of which is connected by a pivot pin 414 to one end of a further link 418 extending across the frame 401, as shown in FIG. 26. The other end of each link 418 is connected by a pivot pin 420 to a plunger 422 slidable across the frame 410 and connected to the piston rod 424 of a piston and cylinder drive unit 426 secured to the frame 401. As the piston rod 424 is retracted the links 412 are retracted and swung from the full line positions in which they are shown in FIG. 26 to the broken line positions in which they are shown in that Figure, so that the jaws 404 are swung open to receive the cable 26, as shown in broken lines in FIG. 26. The jaws can be swung back to their cable gripping position by actuating the unit 426 to advance the piston rod 426.

When a finished harness is to be ejected from the apparatus the jaws 404 are closed about the cable 26 of the harness H and the unit 392 is actuated to drive the jaw carrier 400 along the rails 402 and away from the press 34 so that the jaw carrier 400 actuates a limit switch 428 to cause the unit 426 to retract its piston rod 424 to open the jaws 404 so that the finished harness H falls therefrom.

The apparatus may be programmed by means of the touch screen 54, to produce end harnesses and daisy chain harnesses having connectors 2 and/or 2' secured thereto in any desired order and with each connector in any one of four desired orientations.

The shuttle 44 is moved between only four different positions, one with the separators 154 and 158, in their closed position, aligned with the rams 72' and 74' of the assembly 50, the second with the separators 156 and 160 in their closed position, aligned with the rams 72 and 74 of the assembly 48, the third with the holding fixtures of the separators 154 and 158 in their open position aligned with the inserters 214 and 216 of the assembly 52, whereby the hooks 208 and 210 are mated, and the fourth with the connector holding fixtures of the separators 156 and 160 aligned with the inserters 214 and 216 and with the hooks 208 and 210 thereby mated. As the inserters 214 and 216 are independently actuable, either one connector body 10 and its corresponding cover 12, or two bodies 10 with their corresponding covers 12 can be inserted in their holding fixtures into the press 43 in the third and fourth positions of the shuttle 44.

As the press platens 228 and 240 are closed to mate either a single cover 12 with a single body 10, or two covers 12 each with a body 10, the spring clips 198 of the holding fixtures in the press are released by engagement of the cam followers 204 with the rams 206 as will be apparent from FIG. 23 so that when the platens are moved apart, the connectors 2 or 2' are left secured to the cable and free of the holding fixtures, so that the cable can be advanced.

The cable clamp 340 of the assembly 36 is always kept closed about the cable 26, except when the cable is to be fed, or when a finished harness is to be ejected by means of the assembly 40.

For use with connectors which do not have covers, the holding fixtures 172 could be provided with means equivalent to the cavities 24, for stuffing the cable conductors 27 into the wire receiving portions of the terminals of the connector.

We claim:
1. Apparatus for orientating elongate bodies, the apparatus comprising:
   a frame;
   means on the frame for containing first and second vertical stacks of said elongate bodies;
   escapement means movably mounted in the frame, beneath said containing means, for releasing one body at a time from a selected one of said stacks to allow the body to fall from the stack;
   first and second traps mounted in the frame beneath the escapement means, for movement between a first, body supporting position in which the traps are adjacent to one another to support a body released by the escapement means, and a second, body release position in which the traps are relatively displaced from one another to allow a body supported thereby to fall therebetween and thereby to release the body;

means for guiding a body released by the body escapement means onto the traps so that the body lies thereon in juxtaposed relationship to the traps when they are in their first position, so that the body spans the traps;

first and second receptacles mounted on the frame and beneath the traps each for receiving and supporting a body released thereby, in an upstanding position;

means on the frame for moving a selected one of the receptacles into a position to receive a body released by the traps; and means for moving each trap, individually, from its first towards its second position to determine the vertical orientation with which the body is received in this selected receptacle.

2. Apparatus as claimed in claim 1, wherein the traps are movable towards and away from one another in a horizontal plane, said escapement means also being horizontally movable and said escapement means and said traps having common drive and timing means.

3. Apparatus as claimed in claim 1, wherein the escapement means comprises horizontally movable slides each having a chamfered upper surface providing said guiding means.

4. Apparatus as claimed in claim 1, wherein the traps and the escapement means are driven through a common drive unit connected thereto by way of a timing belt and individual clutches each of which drives a horizontally movable slide.

5. Apparatus as claimed in claim 1, wherein the receptacles are mounted in side by side relationship on an indexing carriage which is horizontally slidable in the frame, beneath the traps, and which is provided with means defining upwardly open body receiving cavities in which are adaptor inserts arranged in opposite vertical orientations.

6. Apparatus as claimed in claim 5, further comprising a cruciform cross section ram movable through each body receiving cavity to eject therefrom, a body in the receptacle, each receptacle comprising a molding defining horizontal slots for guiding the ram through the receptacle.

7. Apparatus for orienting elongate electrical connectors, the apparatus comprising:

a frame;

a pair of vertical magazines on the frame each for containing a stack of said elongate connectors;

an escapement member slidably mounted in the frame beneath each magazine, for releasing one connector at a time from the magazine to allow the connector to fall from the stack therein;

a pair of flat traps mounted beneath the escapement members for sliding movement between a first, connector supporting position in which opposed edges of the traps are adjacent to one another and a second, connector release position in which said edges are spaced from one another to allow a connector supported upon the traps to fall therebetween;

means for guiding each connector released by the escapement members onto the traps when they are in their first position, so as to lie on the traps in parallel relationship thereto and to span the traps;

a pair of movably mounted receptacles in the frame, each for receiving and supporting a connector released by the traps, in a vertical orientation;

means for moving a selected one of the receptacles into a position to receive said body; and drive means for moving a selected one of the escapement members to release a connector from magazine therebeneath and for selectively relatively moving the traps, to ensure that the connector released by the selected escapement member is received in the selected receptacle in a selected vertical orientation.

8. Apparatus as claimed in claim 7, further comprising a cruciform cross section ram movable through the selected receptacle to eject the connector therefrom and a molding on the receptacle defining horizontal slots for guiding the ram therethrough.

9. Apparatus as claimed in claim 7, wherein each magazine is slidably engaged in a reservoir magazine positioned above the respective escapement member and opening theretowards.

* * * * *